United States Patent
Yamano

(10) Patent No.: US 9,835,836 B2
(45) Date of Patent: Dec. 5, 2017

(54) ZOOM LENS AND IMAGE CAPTURING APPARATUS

(71) Applicant: SONY CORPORATION, Tokyo (JP)

(72) Inventor: Hiroki Yamano, Saitama (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 15/186,077

(22) Filed: Jun. 17, 2016

(65) Prior Publication Data

US 2016/0299324 A1    Oct. 13, 2016

Related U.S. Application Data

(62) Division of application No. 13/949,823, filed on Jul. 24, 2013, now abandoned.

(30) Foreign Application Priority Data

Sep. 27, 2012  (JP) .................. 2012-213326

(51) Int. Cl.
| | |
|---|---|
| G02B 15/14 | (2006.01) |
| G02B 15/22 | (2006.01) |
| H04N 5/232 | (2006.01) |
| G02B 15/173 | (2006.01) |
| G02B 1/04 | (2006.01) |
| G02B 15/20 | (2006.01) |

(52) U.S. Cl.
CPC ............. *G02B 15/22* (2013.01); *G02B 1/041* (2013.01); *G02B 15/14* (2013.01); *G02B 15/173* (2013.01); *G02B 15/20* (2013.01); *H04N 5/23296* (2013.01)

(58) Field of Classification Search
CPC ........ G02B 15/22; G02B 1/041; G02B 15/14; G02B 15/173; G02B 15/20; G02B 15/177; G02B 15/161; G02B 15/16; H04N 5/23296
USPC .......................................... 359/676, 691–692
See application file for complete search history.

(56) References Cited

U.S. PATENT DOCUMENTS

| | | | | |
|---|---|---|---|---|
| 5,940,223 | A | * | 8/1999 | Yoshida ................. G02B 7/102 359/699 |
| 2003/0053220 | A1 | | 3/2003 | Sensui |
| 2003/0210472 | A1 | | 11/2003 | Morooka et al. |

FOREIGN PATENT DOCUMENTS

JP      2006-301474 A    11/2006

* cited by examiner

*Primary Examiner* — James Greece
(74) *Attorney, Agent, or Firm* — Chip Law Group

(57) ABSTRACT

There is provided a zoom lens including first and second lens groups independently movable in an optical axis direction in an optical system. Before and after switching between two modes different in minimum focusing distance, a lens group to rule focusing changes between the first and second lens groups or a relative position between the first and second lens groups changes.

18 Claims, 13 Drawing Sheets

ZOOM LENS AND IMAGE CAPTURING APPARATUS

CROSS REFERENCE TO RELATED APPLICATION

The present application is a divisional application of U.S. patent application Ser. No. 13/949,823, filed Jul. 24, 2013, which claims the priority from prior Japanese Priority Patent Application JP 2012-213326 filed in the Japan Patent Office on Sep. 27, 2012, the entire content of which is hereby incorporated by reference.

BACKGROUND

The present technology relates to a zoom lens, and more specifically, to a zoom lens capable of sufficiently reducing a minimum focusing distance and suitable for a digital still camera, a video camera, a monitoring camera and the like and an image capturing apparatus using the zoom lens.

The market of digital still cameras is growing exceedingly in recent years and users' requests for the digital still cameras are being diversified. The requests are exceedingly spreading for higher magnifications of camera lenses, F values for brighter lenses, compatibility with macro functions that enable image capturing of closer-distance subjects, in recent years, and needless to say, being high in image quality and small in dimensions. Generally, many zoom lenses targeting to be small in dimensions and high in magnification employ a system in which only one lens group moves for focusing and the focusing is performed by moving that focus lens group in the optical axis. In particular, a zoom lens for quick focusing, reduced load on actuators, and further, a small focus unit expects lens groups light in weight which are driven. Therefore, optical systems such as so-called inner focusing one and rear focusing one are well known which facilitate focus lenses to be small in dimensions and light in weight relatively readily (for example, see: Japanese Patent Laid-Open No. 2006-301474).

SUMMARY

In case of the optical systems in the above-mentioned focusing manners, since a movable lens group is disposed in the optical system, a moving stroke in the optical axis is limited and a minimum focusing distance is difficult to be reduced. In particular, a zoom lens at a telescopic position which lens has a long practical focal length which is liable to cause large image magnification in its optical system and an optical system which a large-scale sensor is built in expect a large focus lens movement amount in focusing from a distant view to a short distance subject, this enhancing this tendency to a quite significant extent. Moreover, an existing macro mode assumes that close-up image capturing is performed at the telescopic end, at a specific focal length, or in a specific field of view, this making the zoom range difficult to be wide.

It is desirable to attain a macro mode in which a minimum focusing distance can be largely reduced over the whole zoom range even in an optical system high in magnification or a zoom lens which a large-scale sensor is built in. Incidentally, examples of such a large-scale sensor can include, for example, sizes of 1/1.7, 2/3, 1.0, APS, 35 mm and the like.

According to a first embodiment of the present technology, there is provided a zoom lens including first and second lens groups independently movable in an optical axis direction in an optical system. Before and after switching between two modes different in minimum focusing distance, a lens group to rule focusing changes between the first and second lens groups or a relative position between the first and second lens groups changes. Thereby, changing a relative position between the first and second lens groups or a role to rule focusing between them enables to perform switching between the two modes different in minimum focusing distance without any change of the other lens positions.

According to the first embodiment of the present technology, in a mode shorter in minimum focusing distance of the two modes, a focusing distance range may be changed to a short distance side by shifting any one of the first and second lens groups per zoom position by a certain amount. Thereby, the focusing distance range can be shifted to the short distance side under simple control.

According to the first embodiment of the present technology, at least one of the first and second lens groups may independently move in zooming. Thereby, the first and second lens groups can be allowed to contribute also to zooming, this enabling the zoom lens to optimize movement of the whole optical system.

According to the first embodiment of the present technology, both of the first and second lens groups may move in focusing, with movement amounts of the first and second lens groups associated with each other. Thereby, a floating focus system is applied in a mode short in minimum focusing distance and field curvature aberration arising in focusing can be corrected.

According to the first embodiment of the present technology, the first and second lens groups may be arranged alongside on a closest side to an image in the optical system. Thereby, the configuration of the first and second lens groups can be made simple, small in dimensions and light in weight.

According to the first embodiment of the present technology, each of the first and second lens groups may include one lens. At least one of the first and second lens groups may include one plastic lens. Thereby, the first and second lens groups can be made small in dimensions and light in weight.

According to a second embodiment of the present technology, there is provided a zoom lens including, in order from an object side, a first zoom lens group having positive refractive power, a second zoom lens group having negative refractive power, a third zoom lens group having positive refractive power, and a fourth zoom lens group having positive refractive power. A negative lens disposed on a closest side to an image in the third lens group and a positive lens included in the fourth zoom lens group are independently movable in an optical axis. Before and after switching between two modes different in minimum focusing distance, a lens to rule focusing changes between the negative lens and the positive lens or a relative position between the negative lens and the positive lens changes. It is applied to a zoom lens including four lens groups.

According to a third embodiment of the present technology, there is provided a zoom lens including, in order from an object side, a first zoom lens group having positive refractive power, a second zoom lens group having negative refractive power, a third zoom lens group having positive refractive power, a fourth zoom lens group having negative refractive power, and a fifth zoom lens group having positive refractive power. A negative lens included in the fourth zoom lens group and a positive lens included in the fifth zoom lens group are independently movable in an optical axis direction. Before and after switching between two modes different in minimum focusing distance, a lens to rule focusing changes between the negative lens and the positive lens or a relative position between the negative lens and the positive lens changes. It is applied to a zoom lens including five lens groups.

According to the third embodiment of the present technology, there is provided an image capturing apparatus including a zoom lens including first and second lens groups independently movable in an optical axis direction in an optical system, and an image sensor converting an optical image formed by the zoom lens into an electric signal. Before and after switching between two modes different in minimum focusing distance, a lens group to rule focusing changes between the first and second lens groups or a relative position between the first and second lens groups changes. Thereby, changing a relative position between the first and second lens groups in the zoom lens or a role to rule focusing between them enables to perform switching between the two modes different in minimum focusing distance without any change of the other lens positions.

Moreover, in the fourth aspect, a selection part configured to select one of the above-mentioned two modes may be further included. Thereby, the user can select any of the two modes.

According to embodiments of the present technology, a macro mode in which a minimum focusing distance is largely reduced over the whole zoom range can be attained even in an optical system high in magnification or a zoom lens which a large-scale sensor is built in.

DETAILED DESCRIPTION OF THE EMBODIMENT(S)

Figure 1:
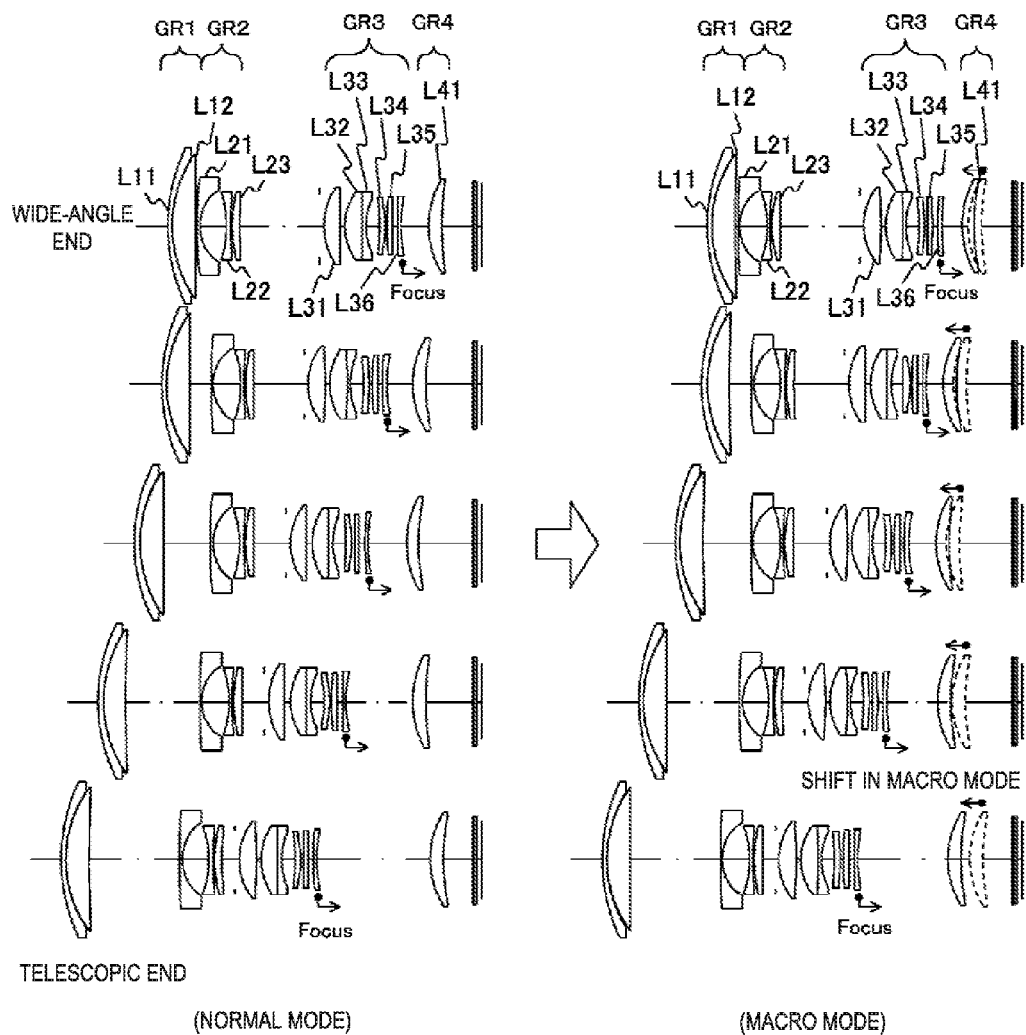
FIG. 1 is a diagram illustrating a lens configuration of a zoom lens according to a first embodiment of the present technology.

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

A zoom lens according to an embodiment of the present disclosure includes, for example, two focus actuators each of which is configured of a drive mechanism such as a linear motor and a stepping motor, and two movable lens groups driven in the optical axis direction by the respective actuators, in the optical system. It has a macro mode for reducing the minimum focusing distance as well as a normal mode in which focusing is possible from a distant view to a short distance object. Before and after switching between the normal mode and macro mode, a lens group to rule focusing changes between the two movable lens groups or a relative position between the two movable lens groups changes.

In the zoom lens according to the embodiment of the present disclosure, the macro mode may be configured by actuator drive. Thereby, for example, the lens barrel structure can be simpler than in case of employing a mechanical lens barrel mechanism and the mode switching can be smooth in practical use, these being merits in view of the camera being small in dimensions and its usability.

As to preferable embodiments, methods can include shifting one of the two movable lens groups arranged in the optical system with the actuator by a certain amount for each zoom position in selecting the macro mode, and changing the focusing distance range to the short distance side over the whole zoom range. Thereby, a back focus of the optical system can be shifted by a certain amount for each zoom position in an exceedingly simple manner, this enabling the focusing distance range to be shifted to the short distance side simply and the actuator control to be simple.

Moreover, it is preferable that the zoom lens according to the embodiment of the present disclosure satisfies the following conditional expressions (a) and (b):

$$0.01 < |D_{macro\_w}|/fw < 0.1 \qquad \text{conditional expression (a)}$$

$$0.02 < |D_{macro\_t}|/ft < 0.2 \qquad \text{conditional expression (b)}$$

where $D_{macro\_w}$: movement amount of the shift lens in selecting the macro mode at the wide-angle end, $D_{macro\_t}$: movement amount of the shift lens in selecting the macro mode at the telescopic end, fw: system focal length at the wide-angle end, and ft: system focal length at the telescopic end.

In the zoom lens according to the embodiment of the present disclosure, at least one of the two movable lens groups in the optical system independently moves in zooming. Thereby, the movable lens group is allowed to contribute also to zooming, this enabling the zoom lens to be small in dimensions and high in magnification and to attain high image quality. Moreover, efficiency in use of the moving stroke of the actuators mounted on the lens barrel can be enhanced at its maximum.

In one of the best embodiments, it is desirable to employ a floating focus system in which both of the two movable lens groups in the optical system move in focusing, associating their movement amounts with each other. Thereby, field curvature aberration arising in focusing can be corrected favorably. Therefore, a wide-angle lens, a zoom lens at a telescopic position which has a long practical focal length, and an optical system which a large-scale sensor is built in, which lenses and system are liable to suffer from field curvature in focusing can attain enhancement of image quality in short-range image capturing. Herein, examples of such a large-scale sensor can include, for example, sizes of 1/1.7, 2/3, 1.0, APS, 35 mm and the like. In particular, a large-diameter lens, for example, with F2.8 or less at the wide-angle end and with F4.0 or less at the telescopic end has an exceedingly shallow depth of focus, and therefore, such arising of field curvature aberration directly leads to significant deterioration of image quality. Accordingly, the above-mentioned floating focus system is especially effective for enhancement of image quality. Furthermore, such a configuration can also attain efficiency in use of the moving stroke of the actuators mounted on the lens barrel to be enhanced at its maximum.

In the zoom lens according to the embodiment of the present disclosure, both of the two movable lens groups in the optical system are arranged closer to the image side relative to the F value determining member (aperture stop), and are arranged alongside on the closest side to the image in the optical system. Thereby, compared with an optical system of focusing with a lens arranged on the closer side to the object relative to the F value determining member, the configuration of the movable lens groups can be easier to be simple and to be small in dimensions and light in weight. Moreover, the actuators driving them can be made small in dimensions at the same time, this eventually enabling the lens barrel to be small in dimensions.

In the zoom lens according to the embodiment of the present disclosure, the two movable lens groups in the optical system each is configured of one lens. Thereby, the lens groups which are driven can be small in dimensions and light in weight, this enabling load on the actuators to be reduced and focus speed and focus accuracy to be improved. In particular, in one of the best embodiments, at least one of the two movable lens groups in the optical system is preferable to be configured of one plastic lens. Thereby, the above-mentioned merit can be attained more effectively.

A zoom lens according to the embodiment of the present disclosure includes, in the order from the object side, four lens groups of a first zoom lens group having positive refractive power, a second zoom lens group having negative refractive power, a third zoom lens group having positive refractive power and a fourth zoom lens group having positive refractive power. In this case, the negative lens arranged on the closest side to the image in the third lens group and the positive lens included in the fourth lens group are movable in the optical axis direction with the respective focus actuators. Moreover, one with another configuration includes, in the order from the object side, five lens groups of a first zoom lens group having positive refractive power, a second zoom lens group having negative refractive power, a third zoom lens group having positive refractive power, a fourth zoom lens group having negative refractive power and a fifth zoom lens group having positive refractive power. In this case, the negative lens included in the fourth lens group and the positive lens included in the fifth zoom lens are movable in the optical axis direction with the respective focus actuators. Employing such zooming configurations and focusing configurations can attain a zoom lens to be small in dimensions and high in magnification, enabling the F value to be sufficient for being bright and the minimum focusing distance to be sufficient for being short.

Hereafter, the description is made in the following order.
1. First Embodiment (Example 1 of Movement Mode)
2. Second Embodiment (Example 2 of Movement Mode)
3. Third Embodiment (Example 3 of Movement Mode)
4. Fourth Embodiment (Example 4 of Movement Mode)
5. Fifth Embodiment (Example 5 of Movement Mode)
6. Sixth Embodiment (Example 6 of Movement Mode)
7. Seventh Embodiment (Example 7 of Movement Mode)
8. Eighth Embodiment (Example 1 of Numerical Values)
9. Ninth Embodiment (Example 2 of Numerical Values)
10. Tenth Embodiment (Example 3 of Numerical Values)
11. Eleventh Embodiment (Example 4 of Numerical Values)
12. Twelfth Embodiment (Example 5 of Numerical Values)
13. Application Example (Image capturing Apparatus)

1. First Embodiment

[Lens Configuration]

FIG. 1 is a diagram illustrating a lens configuration of a zoom lens according to a first embodiment of the present technology. The zoom lens has a normal mode in which focusing is possible from a distant view to a short distance object and a macro mode for reducing the minimum focusing distance compared with that in the normal mode. In the figure, a movement mode in the normal mode is illustrated on the left side thereof and a movement mode in the macro mode is illustrated on the right side thereof. Moreover, arrangement of the lenses at the wide-angle end is illustrated in the uppermost portion, arrangement of the lenses at the telescopic end is illustrated in the lowermost portion and the transitions from the wide-angle end to the telescopic end are illustrated in the three middle portions. Similarly, this applies to second to seventh embodiments below.

The zoom lens includes, in the order from the object side, a first zoom lens group GR1 having positive refractive power, a second zoom lens group GR2 having negative refractive power, a third zoom lens group GR3 having positive refractive power and a fourth zoom lens group GR4 having positive refractive power.

The first zoom lens group GR1 includes a cemented lens configured by joining, in the order from the object side to the image side, a meniscus-shaped negative lens L11 concave to the image side and a meniscus-shaped positive lens L12 convex to the object side with each other.

The second zoom lens group GR2 is configured by arranging a meniscus-shaped negative lens L21 concave to the image side, a negative lens L22 and a meniscus-shaped positive lens L23 convex to the object side in the order from the object side to the image side.

The third zoom lens group GR3 is configured by arranging a positive lens L31, a cemented lens including a positive lens L32 and a negative lens L33, a meniscus-shaped positive lens L34 convex to the image side, a positive lens L35 and a meniscus-shaped negative lens L36 concave to the image side in the order from the object side to the image side.

The fourth zoom lens group GR4 includes a meniscus-shaped positive lens L41 convex to the object side.

[Movement Mode]

In the zoom lens according to the first embodiment, the first zoom lens group GR1 moves to the object side such that the distance toward the second zoom lens group GR2 lengthens in zooming from the wide-angle end to the telescopic end. At this stage, the third zoom lens group GR3 moves to the object side such that the distance toward the second zoom lens group GR2 shortens. In the zooming between the wide-angle end and telescopic end, the second zoom lens group GR2 undergoes transition of moving to the image side followed by moving to the object side. In the zooming from the wide-angle end to the telescopic end, the fourth zoom lens group GR4 undergoes transition of moving to the object side followed by moving to the image side.

As to the zoom lens, in focusing from a long distance to a short distance, the negative lens L36 of the third zoom lens group GR3 moves in orientation to the image side along the optical axis. Moreover, in switching from the normal mode to the macro mode, the positive lens L41 of the fourth zoom lens group GR4 moves (shifts) in orientation to the object side along the optical axis. Namely, before and after switching between the normal mode and macro mode, the relative position between changes the negative lens L36 of the third zoom lens group GR3 and the positive lens L41 of the fourth zoom lens group GR4. In other words, the lenses except the negative lens L36 of the third zoom lens group GR3 and the positive lens L41 of the fourth zoom lens group GR4 do not change in positions before and after the mode switching.

2. Second Embodiment

[Lens Configuration]

Figure 2:
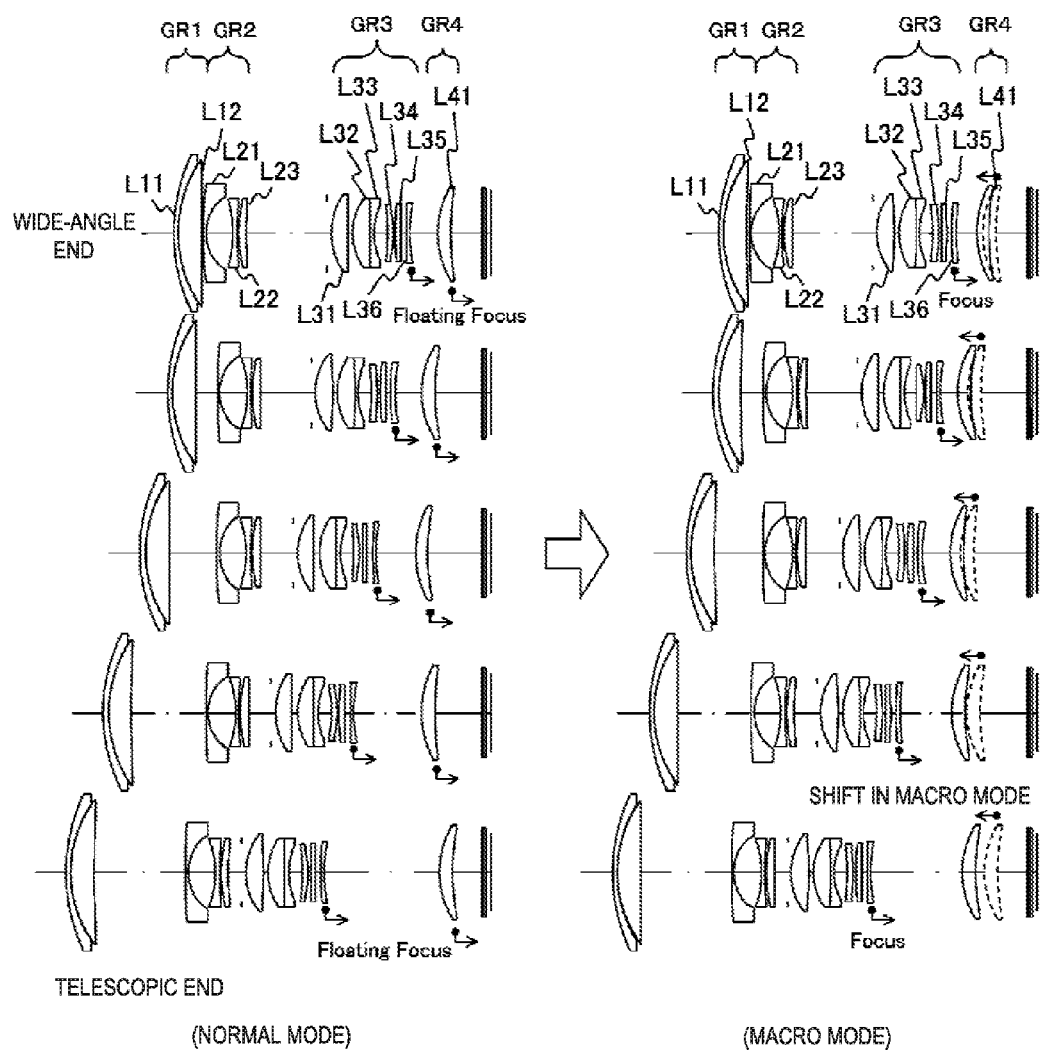
FIG. 2 is a diagram illustrating a lens configuration of a zoom lens according to a second embodiment of the present technology.

FIG. 2 is a diagram illustrating a lens configuration of a zoom lens according to a second embodiment of the present technology. The zoom lens basically has the same lens configuration as that according to the above-mentioned first embodiment and its description is omitted.

[Movement Mode]

In the zoom lens according to the second embodiment, the first zoom lens group GR1 moves to the object side such that the distance toward the second zoom lens group GR2 lengthens in zooming from the wide-angle end to the telescopic end. At this stage, the third zoom lens group GR3 moves to the object side such that the distance toward the second zoom lens group GR2 shortens. In the zooming between the wide-angle end and telescopic end, the second zoom lens group GR2 undergoes transition of moving to the image side followed by moving to the object side. In the zooming from the wide-angle end to the telescopic end, the fourth zoom lens group GR4 undergoes transition of moving to the object side followed by moving to the image side.

As to the zoom lens, in the normal mode, in focusing from a long distance to a short distance, the negative lens L36 of the third zoom lens group GR3 and the positive lens L41 of the fourth zoom lens group GR4 moves in orientation to the image side, associating their movement amounts with each other. Namely, the zoom lens employs the floating focus system. Moreover, in switching from the normal mode to macro mode, the positive lens L41 of the fourth zoom lens group GR4 moves (shifts) in orientation to the object side along the optical axis. Namely, before and after switching between the normal mode and macro mode, the relative position between the negative lens L36 of the third zoom lens group GR3 and the positive lens L41 of the fourth zoom lens group GR4 changes. Moreover, before and after the switching between the normal mode and macro mode, a lens to rule focusing changes between the negative lens L36 of the third zoom lens group GR3 and the positive lens L41 of the fourth zoom lens group GR4. In other words, the lenses except the negative lens L36 of the third zoom lens group GR3 and the positive lens L41 of the fourth zoom lens group GR4 do not change in positions before and after the mode switching.

3. Third Embodiment

[Lens Configuration]

Figure 3:
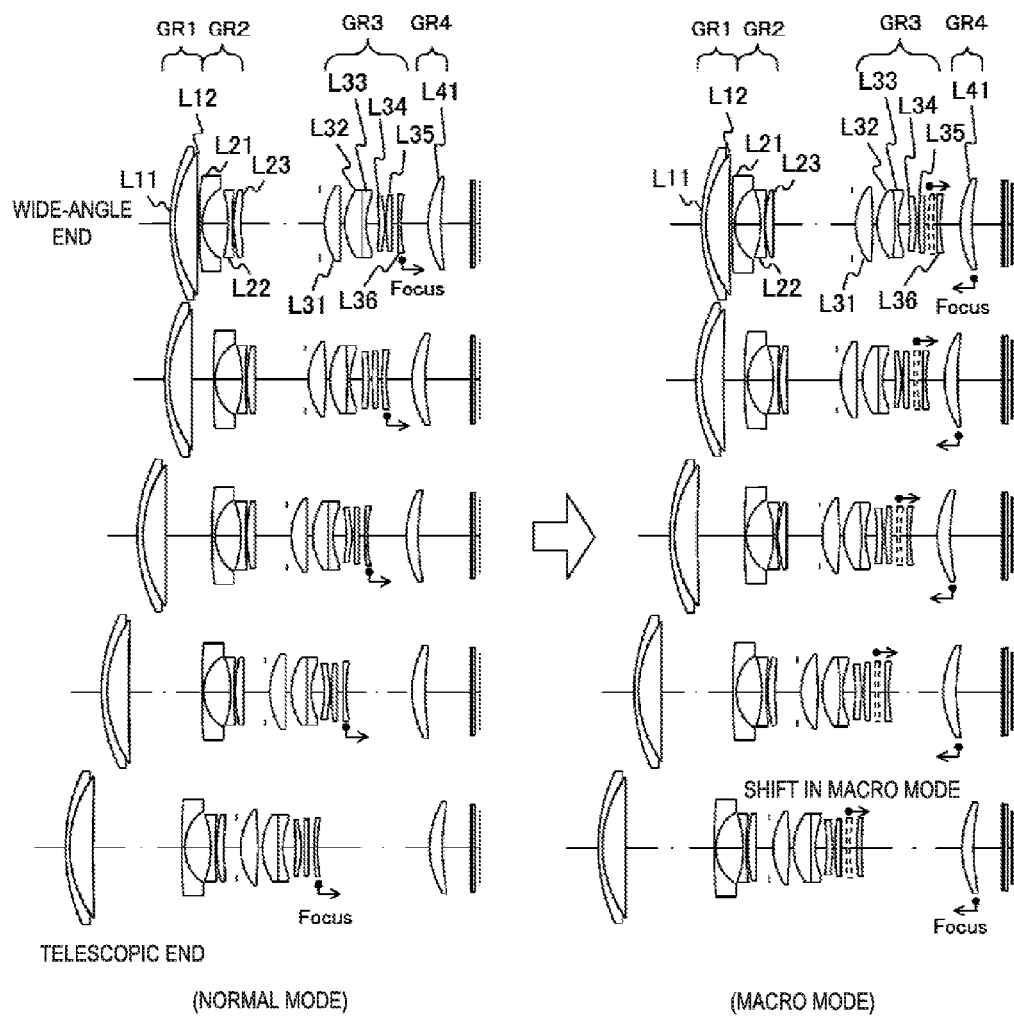
FIG. 3 is a diagram illustrating a lens configuration of a zoom lens according to a third embodiment of the present technology.

FIG. 3 is a diagram illustrating a lens configuration of a zoom lens according to a third embodiment of the present technology. The zoom lens basically has the same lens configuration as that according to the above-mentioned first embodiment and its description is omitted.

[Movement Mode]

In the zoom lens according to the third embodiment, the first zoom lens group GR1 moves to the object side such that the distance toward the second zoom lens group GR2 lengthens in zooming from the wide-angle end to the telescopic end. At this stage, the third zoom lens group GR3 moves to the object side such that the distance toward the second zoom lens group GR2 shortens. In the zooming between the wide-angle end and telescopic end, the second zoom lens group GR2 undergoes transition of moving to the image side followed by moving to the object side. In the zooming from the wide-angle end to the telescopic end, the fourth zoom lens group GR4 undergoes transition of moving to the object side followed by moving to the image side.

As to the zoom lens, in the normal mode, in focusing from a long distance to a short distance, the negative lens L36 of the third zoom lens group GR3 moves in orientation to the image side along the optical axis. Moreover, in switching from the normal mode to the macro mode, the negative lens L36 of the third zoom lens group GR3 moves (shifts) in orientation to the image side along the optical axis. In the macro mode, in the focusing from a long distance to a short distance, the positive lens L41 of the fourth zoom lens group GR4 moves in orientation to the object side along the optical axis. Namely, before and after the switching between the normal mode and macro mode, a lens to rule focusing changes between the negative lens L36 of the third zoom lens group GR3 and the positive lens L41 of the fourth zoom lens group GR4. Moreover, before and after the switching between the normal mode and macro mode, the relative position between the negative lens L36 of the third zoom lens group GR3 and the positive lens L41 of the fourth zoom lens group GR4 changes. In other words, the lenses except the negative lens L36 of the third zoom lens group GR3 and the positive lens L41 of the fourth zoom lens group GR4 do not change in positions before and after the mode switching.

4. Fourth Embodiment

[Lens Configuration]

Figure 4:
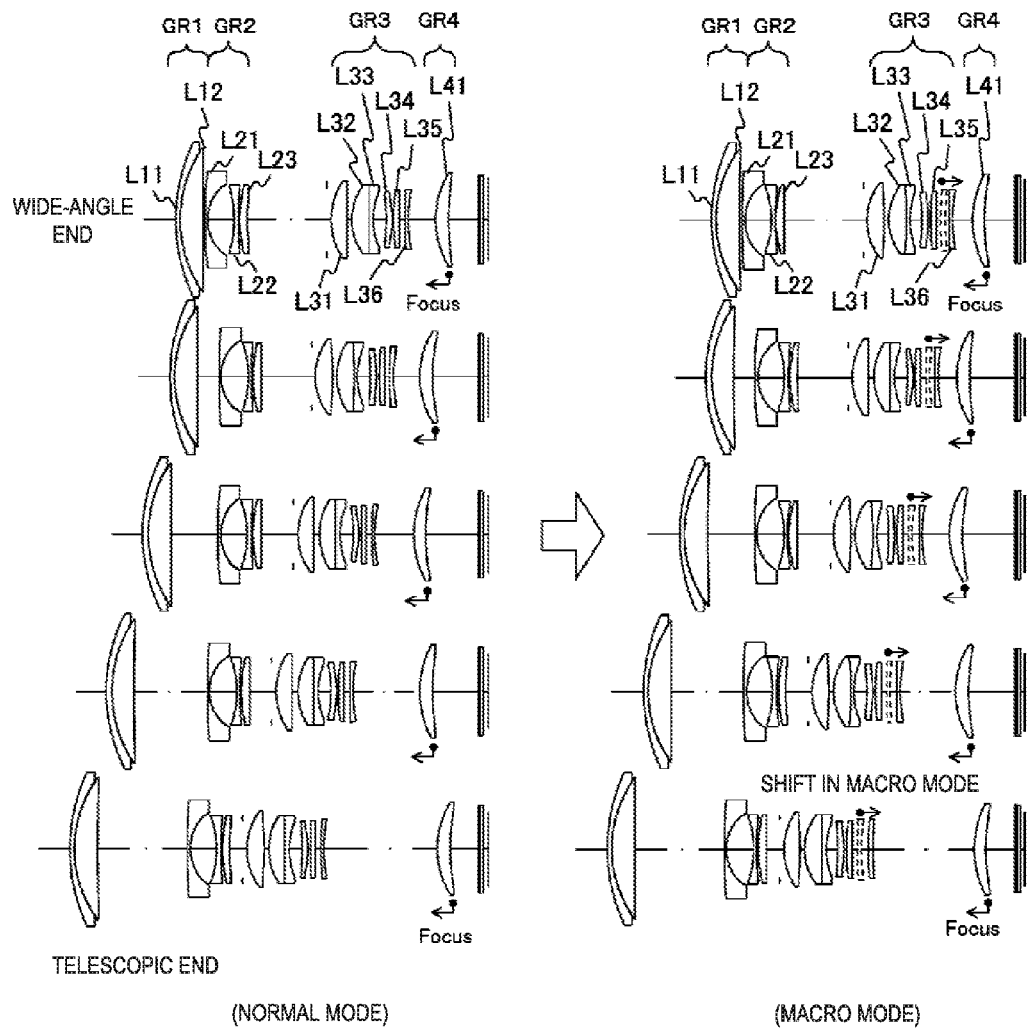
FIG. 4 is a diagram illustrating a lens configuration of a zoom lens according to a fourth embodiment of the present technology.

FIG. 4 is a diagram illustrating a lens configuration of a zoom lens according to a fourth embodiment of the present technology. The zoom lens basically has the same lens configuration as that according to the above-mentioned first embodiment and its description is omitted.

[Movement Mode]

In the zoom lens according to the fourth embodiment, the first zoom lens group GR1 moves to the object side such that the distance toward the second zoom lens group GR2 lengthens in zooming from the wide-angle end to the telescopic end. At this stage, the third zoom lens group GR3 moves to the object side such that the distance toward the second zoom lens group GR2 shortens. In the zooming between the wide-angle end and telescopic end, the second zoom lens group GR2 undergoes transition of moving to the image side followed by moving to the object side. In the zooming from the wide-angle end to the telescopic end, the fourth zoom lens group GR4 undergoes transition of moving to the object side followed by moving to the image side.

As to the zoom lens, in focusing from a long distance to a short distance, the positive lens L41 of the fourth zoom lens group GR4 moves in orientation to the object side along the optical axis. Moreover, in switching from the normal mode to the macro mode, the negative lens L36 of the third zoom lens group GR3 moves (shifts) in orientation to the image side along the optical axis. Namely, before and after the switching between the normal mode and macro mode, the relative position between the negative lens L36 of the third zoom lens group GR3 and the positive lens L41 of the fourth zoom lens group GR4 changes. In other words, the lenses except the negative lens L36 of the third zoom lens group GR3 and the positive lens L41 of the fourth zoom lens group GR4 do not change in positions before and after the mode switching.

5. Fifth Embodiment

[Lens Configuration]

Figure 5:
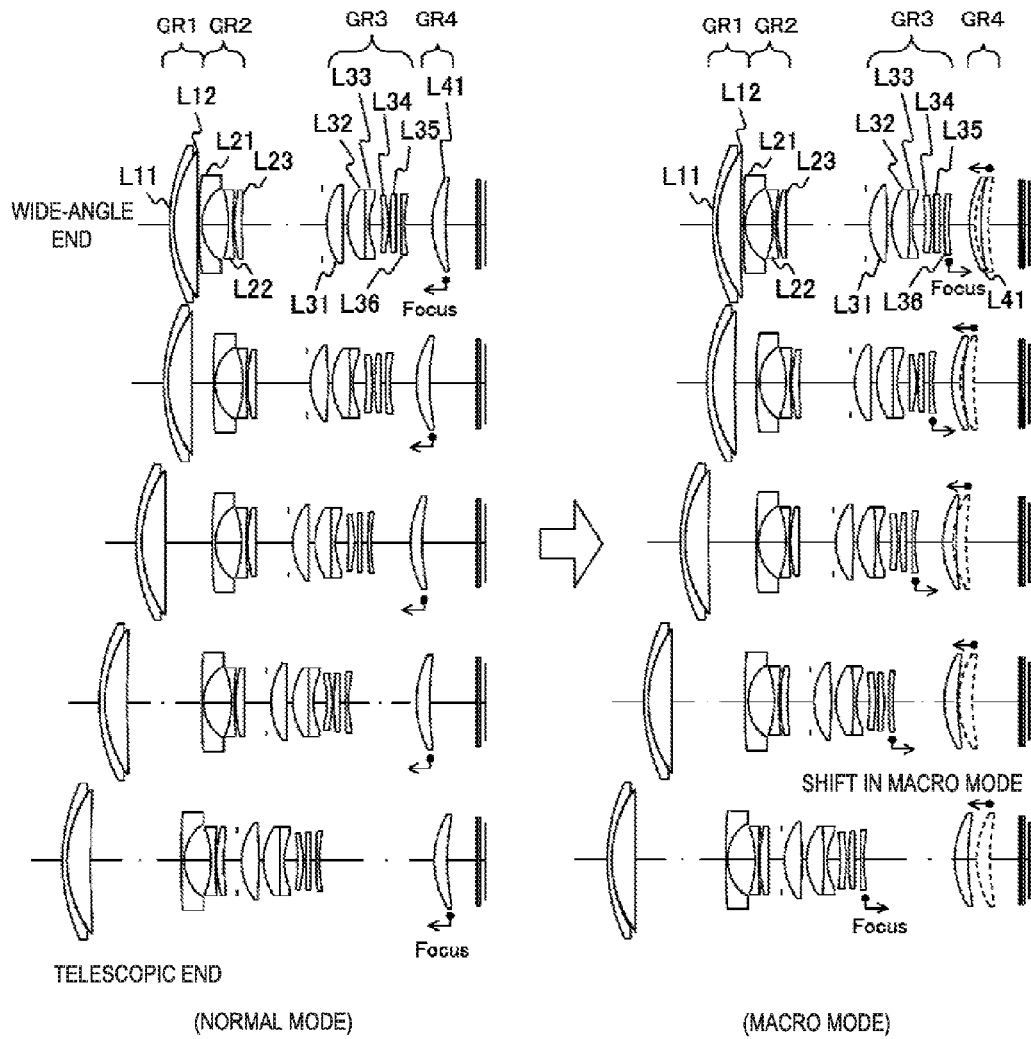
FIG. 5 is a diagram illustrating a lens configuration of a zoom lens according to a fifth embodiment of the present technology.

FIG. 5 is a diagram illustrating a lens configuration of a zoom lens according to a fifth embodiment of the present technology. The zoom lens basically has the same lens configuration as that according to the above-mentioned first embodiment and its description is omitted.

[Movement Mode]

In the zoom lens according to the fifth embodiment, the first zoom lens group GR1 moves to the object side such that the distance toward the second zoom lens group GR2 lengthens in zooming from the wide-angle end to the telescopic end. At this stage, the third zoom lens group GR3 moves to the object side such that the distance toward the second zoom lens group GR2 shortens. In the zooming between the wide-angle end and telescopic end, the second zoom lens group GR2 undergoes transition of moving to the image side followed by moving to the object side. In the zooming from the wide-angle end to the telescopic end, the fourth zoom lens group GR4 undergoes transition of moving to the object side followed by moving to the image side.

As to the zoom lens, in the normal mode, in focusing from a long distance to a short distance, the positive lens L41 of the fourth zoom lens group GR4 moves in orientation to the object side along the optical axis. Moreover, in switching from the normal mode to macro mode, the positive lens L41 of the fourth zoom lens group GR4 moves (shifts) in orientation to the object side along the optical axis. Meanwhile, in the macro mode, in focusing from a long distance to a short distance, the negative lens L36 of the third zoom lens group GR3 moves in orientation to the image side along the optical axis. Moreover, before and after the switching between the normal mode and macro mode, a lens to rule focusing changes between the negative lens L36 of the third zoom lens group GR3 and the positive lens L41 of the fourth zoom lens group GR4. Namely, before and after switching between the normal mode and macro mode, the relative position between the negative lens L36 of the third zoom lens group GR3 and the positive lens L41 of the fourth zoom lens group GR4 changes. In other words, the lenses except the negative lens L36 of the third zoom lens group GR3 and the positive lens L41 of the fourth zoom lens group GR4 do not change in positions before and after the mode switching.

6. Sixth Embodiment

[Lens Configuration]

Figure 6:
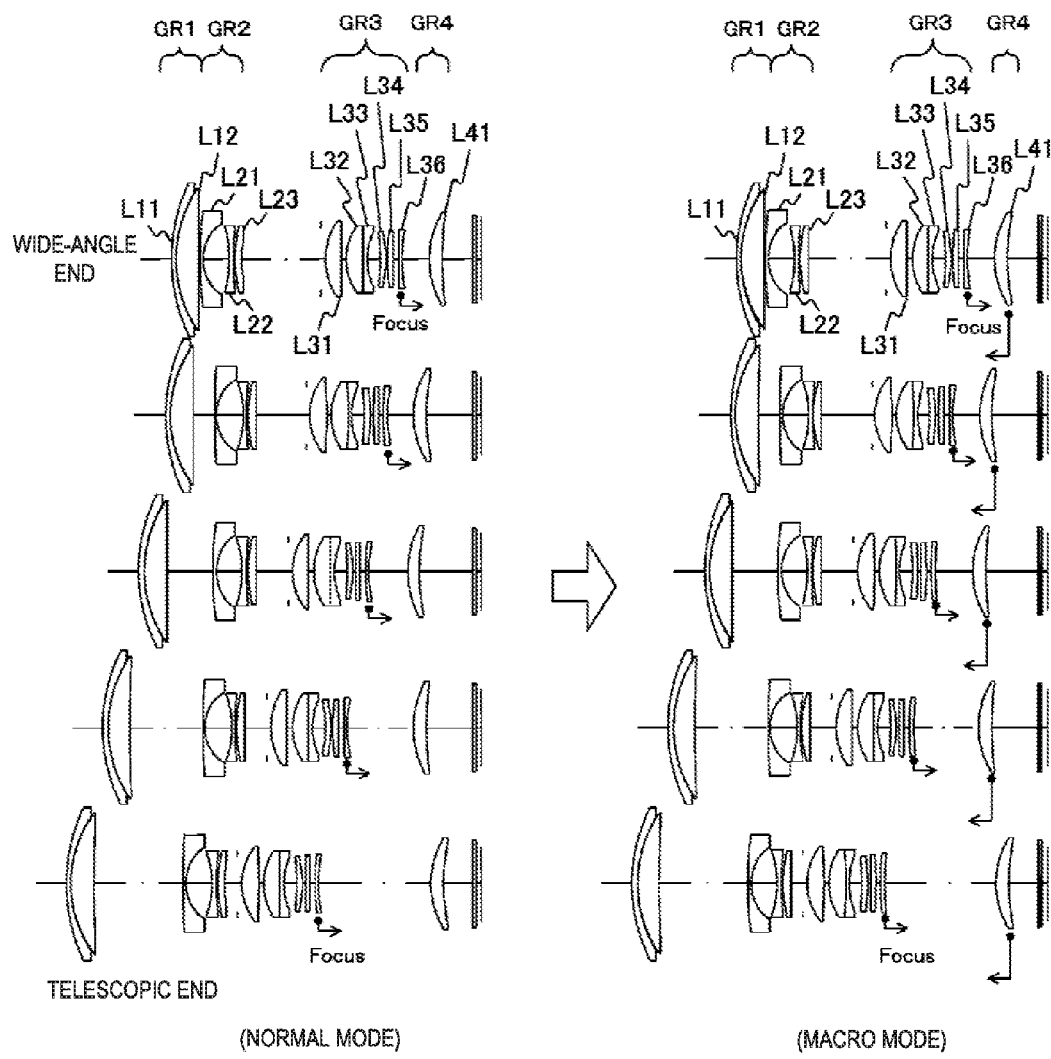
FIG. 6 is a diagram illustrating a lens configuration of a zoom lens according to a sixth embodiment of the present technology.

FIG. 6 is a diagram illustrating a lens configuration of a zoom lens according to a sixth embodiment of the present technology. The zoom lens basically has the same lens configuration as that according to the above-mentioned first embodiment and its description is omitted.

[Movement Mode]

In the zoom lens according to the sixth embodiment, the first zoom lens group GR1 moves to the object side such that the distance toward the second zoom lens group GR2 lengthens in zooming from the wide-angle end to the telescopic end. At this stage, the third zoom lens group GR3 moves to the object side such that the distance toward the second zoom lens group GR2 shortens. In the zooming between the wide-angle end and telescopic end, the second zoom lens group GR2 undergoes transition of moving to the image side followed by moving to the object side. In the zooming from the wide-angle end to the telescopic end, the fourth zoom lens group GR4 undergoes transition of moving to the object side followed by moving to the image side.

As to the zoom lens, in the normal mode, in focusing from a long distance to a short distance, the negative lens L36 of the third zoom lens group GR3 moves in orientation to the image side along the optical axis. Meanwhile, in the macro mode, in focusing from a long distance to a short distance, the negative lens L36 of the third zoom lens group GR3 moves in orientation to the image side along the optical axis and the positive lens L41 of the fourth zoom lens group GR4 moves in orientation to the object side along the optical axis. Namely, before and after the switching between the normal mode and macro mode, a lens to rule focusing changes between the negative lens L36 of the third zoom lens group GR3 and the positive lens L41 of the fourth zoom lens group GR4. Moreover, before and after the switching between the normal mode and macro mode, the relative position between the negative lens L36 of the third zoom lens group GR3 and the positive lens L41 of the fourth zoom lens group GR4 changes. In other words, the lenses except the negative lens L36 of the third zoom lens group GR3 and the positive lens L41 of the fourth zoom lens group GR4 do not change in positions before and after the mode switching.

7. Seventh Embodiment

[Lens Configuration]

Figure 7:
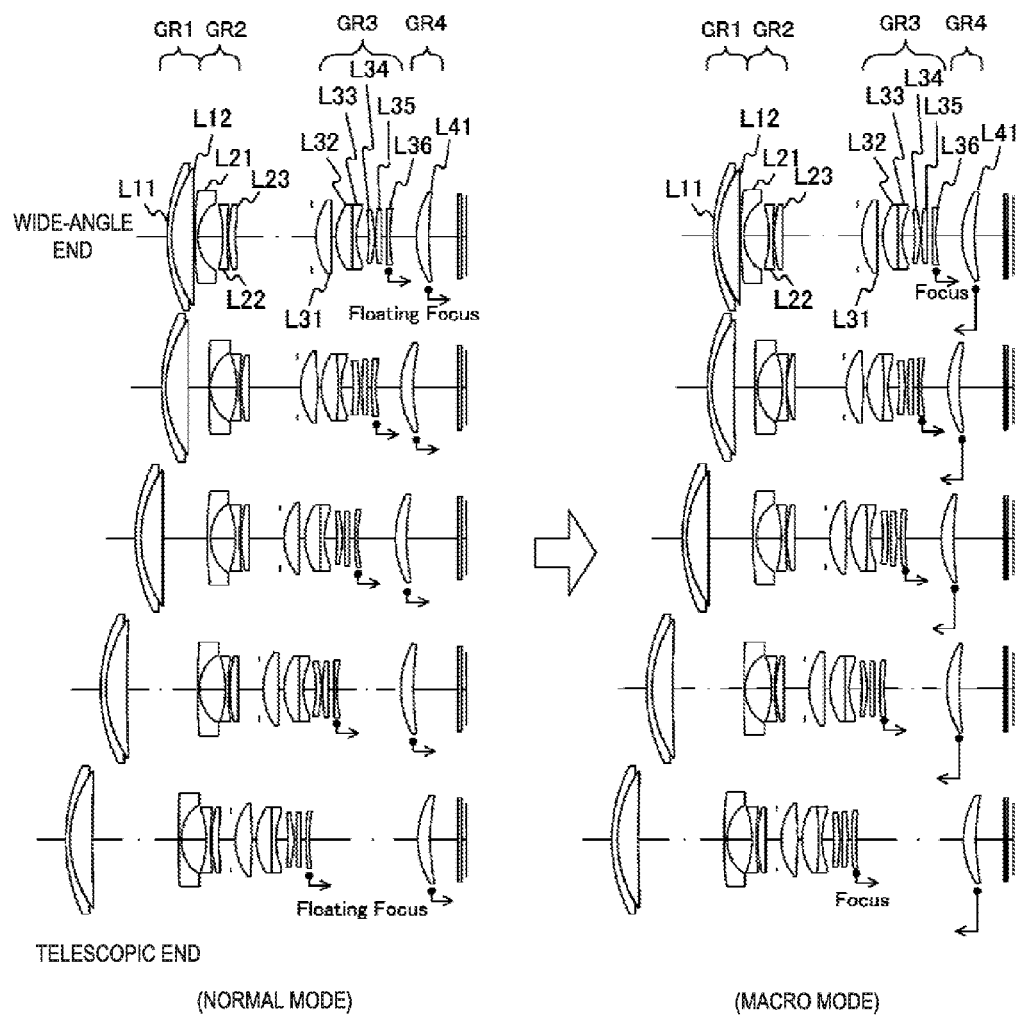
FIG. 7 is a diagram illustrating a lens configuration of a zoom lens according to a seventh embodiment of the present technology.

FIG. 7 is a diagram illustrating a lens configuration of a zoom lens according to a seventh embodiment of the present technology. The zoom lens basically has the same lens configuration as that according to the above-mentioned first embodiment and its description is omitted.

[Movement Mode]

In the zoom lens according to the seventh embodiment, the first zoom lens group GR1 moves to the object side such that the distance toward the second zoom lens group GR2 lengthens in zooming from the wide-angle end to the telescopic end. At this stage, the third zoom lens group GR3 moves to the object side such that the distance toward the second zoom lens group GR2 shortens. In the zooming between the wide-angle end and telescopic end, the second zoom lens group GR2 undergoes transition of moving to the image side followed by moving to the object side. In the zooming from the wide-angle end to the telescopic end, the fourth zoom lens group GR4 undergoes transition of moving to the object side followed by moving to the image side.

As to the zoom lens, in the normal mode, in focusing from a long distance to a short distance, the negative lens L36 of the third zoom lens group GR3 and the positive lens L41 of the fourth zoom lens group GR4 moves in orientation to the image side, associating their movement amounts with each other. Namely, the zoom lens employs the floating focus system. Meanwhile, in the macro mode, the negative lens L36 of the third zoom lens group GR3 moves in orientation to the image side along the optical axis and the positive lens L41 of the fourth zoom lens group GR4 moves in orientation to the object side along the optical axis. Namely, before and after the switching between the normal mode and macro mode, the relative position between the negative lens L36 of the third zoom lens group GR3 and the positive lens L41 of the fourth zoom lens group GR4 changes. In other words, the lenses except the negative lens L36 of the third zoom lens group GR3 and the positive lens L41 of the fourth zoom lens group GR4 do not change in positions before and after the mode switching.

Next, examples of numerical values of the lenses according to the embodiments of the present technology are described. Signs and the like used in the following tables and descriptions mean as follows. Namely, the sign "si" denotes the surface number meaning the ith surface from the object side. The sign "ri" denotes the curvature radius of the ith surface from the object side. The sign "di" denotes the spacing between the ith surface and the (i+1)th surface from the object side along the axis. The sign "ni" denotes the refractive index of the glass material having the ith surface on its object side which index is to the d lines (wavelength of 587.6 nm). The sign "vi" denotes the Abbe number of the glass material having the ith surface on its object side which number is to the d lines. Incidentally, regarding the curvature radius, the sign "INFINITY" indicates that the relevant surface is planar. Moreover, the sign "ASP" attached to the surface number indicates that the relevant surface is non-spherical. Moreover, the sign "STO" for the surface number indicates that the relevant surface is an opening aperture stop. Moreover, the sign "f" denotes a focal length. The sign "Fno" denotes an F value (F number). The sign "ω" denotes a half FOV.

Moreover, some zoom lenses used in the individual embodiments have non-spherical lens surfaces. Each of them is supposed to be defined as follows:

$$x = cy^2/(1+(1-(1+\kappa)c^2y^2)^{1/2}) + A4y^4 + A6y^6 + A8y^8 + A10y^{10}$$

where the sign "x" denotes a distance from the vertex of the lens surface in the optical axis direction (amount of sagging), the sign "y" denotes a height in the direction perpendicular to the optical axis, the sign "c" denotes a paraxial curvature at the lens vertex, and the sign "κ" denotes a conic constant. In addition, the numbers A4, A6, A8 and A10 denote fourth-order, sixth-order, eighth-order and tenth-order non-spherical coefficients.

8. Eighth Embodiment

[Lens Configuration]

Figure 8:
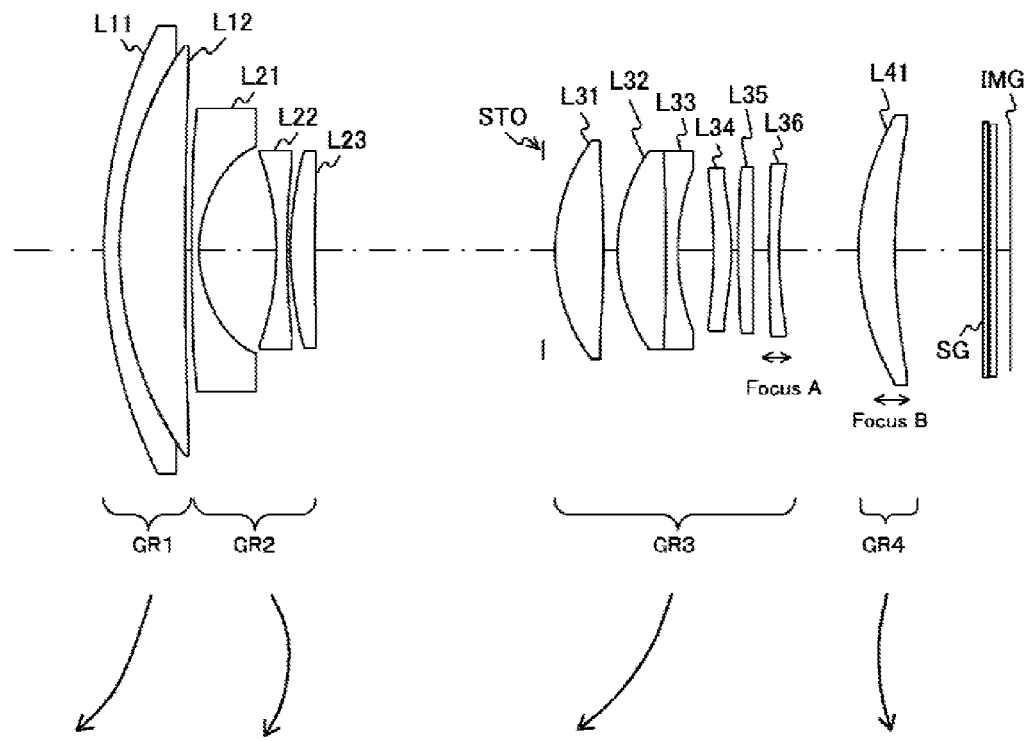
FIG. 8 is a diagram illustrating a lens configuration of a zoom lens according to an eighth embodiment of the present technology.

FIG. 8 is a diagram illustrating a lens configuration of a zoom lens according to an eighth embodiment of the present technology. The zoom lens according to the eighth embodiment includes, in the order from the object side, a first zoom lens group GR1 having positive refractive power, a second zoom lens group GR2 having negative refractive power, a third zoom lens group GR3 having positive refractive power and a fourth zoom lens group GR4 having positive refractive power.

The first zoom lens group GR1 includes a cemented lens configured by joining, in the order from the object side to the image side, a meniscus-shaped negative lens L11 concave to the image side and a meniscus-shaped positive lens L12 convex to the object side.

The second zoom lens group GR2 is configured by arranging a meniscus-shaped negative lens L21 concave to the image side, a negative lens L22 and a meniscus-shaped positive lens L23 convex to the object side in the order from the object side to the image side.

The third zoom lens group GR3 is configured by arranging a positive lens L31, a cemented lens configured of a positive lens L32 and a negative lens L33, a meniscus-shaped positive lens L34 convex to the image side, a positive lens L35 and a meniscus-shaped negative lens L36 concave to the image side in the order from the object side to the image side.

The fourth zoom lens group GR4 includes a meniscus-shaped positive lens L41 convex to the object side.

An opening aperture stop STO is disposed on the object side of the third zoom lens group GR3. Moreover, a filter SG is disposed between the fourth zoom lens group GR4 and an image plane IMG.

The zoom lens employs the floating focus system in which focus lens groups A and B move in association with each other in focusing, where the focus lens group A corresponds to the negative lens L36 and the focus lens group B corresponds to the positive lens L41. In focusing from a long distance to a short distance, the focus lens groups A and B move in orientation to the image side along the optical axis. Relative relationship between lens movement distances of the focus lens groups A and B in focusing changes at each zoom position. Moreover, the lens movement distances of the focus lens groups A and B in focusing meet linearity for both of them.

Moreover, as to the zoom lens, before and after switching between the normal mode and macro mode, the relative position between the negative lens L36 of the third zoom lens group GR3 and the positive lens L41 of the fourth zoom lens group GR4 changes. Moreover, before and after the switching between the normal mode and macro mode, a lens to rule focusing changes between the negative lens L36 of the third zoom lens group GR3 and the positive lens L41 of the fourth zoom lens group GR4.

[Specifications of Zoom Lens]

Table 1 presents data of the lenses in Example 1 of Numerical Values, in which specific numerical values are applied to the zoom lens according to the eighth embodiment.

TABLE 1

| s i | r i | d i | n i | v i |
|---|---|---|---|---|
| 1 | 35.214 | 1.000 | 1.92286 | 20.880 |
| 2 | 24.730 | 4.620 | 1.77250 | 49.624 |
| 3 | 460.000 | (d 3) | | |
| 4 (ASP) | 468.512 | 0.500 | 1.75501 | 51.158 |
| 5 (ASP) | 9.200 | 5.422 | | |
| 6 | −20.000 | 0.750 | 1.72916 | 54.674 |
| 7 | 55.391 | 0.250 | | |
| 8 (ASP) | 20.500 | 1.700 | 2.00170 | 19.324 |
| 9 (ASF) | 86.255 | (d 9) | | |
| STO | INFINITY | 0.800 | | |
| 11 (ASP) | 13.050 | 3.380 | 1.55332 | 71.685 |
| 12 (ASP) | −77.06 | 1.000 | | |

TABLE 1-continued

| s i | r i | d i | n i | v i |
|---|---|---|---|---|
| 13 | 12.120 | 3.430 | 1.59201 | 67.023 |
| 14 | −150.000 | 0.770 | 1.80518 | 25.456 |
| 15 | 14.388 | 2.547 | | |
| 16 (ASP) | −41.297 | 1.220 | 1.72903 | 54.041 |
| 17 (ASP) | −21.580 | 0.500 | | |
| 18 | 77.969 | 1.120 | 1.72916 | 54.674 |
| 19 | −312.042 | (d 19) | | |
| 20 | 151.077 | 0.700 | 1.72916 | 54.674 |
| 21 | 35.396 | (d 21) | | |
| 22 (ASP) | 18.200 | 2.620 | 1.52470 | 56.460 |
| 23 (ASP) | 48.000 | (d 23) | | |
| 24 | INFINITY | 0.300 | 1.51680 | 64.200 |
| 25 | INFINITY | 0.150 | | |
| 26 | INFINITY | 0.500 | 1.51680 | 64.200 |
| 27 | INFINITY | 1.000 | | |
| IMG | INFINITY | | | |

In the zoom lens according to Example 1 of Numerical Values, the both surfaces of the negative lens L21 of the second lens group GR2 (fourth surface and fifth surface), the both surfaces of the positive lens L23 thereof (eighth surface and ninth surface), the both surfaces of the positive lens L31 of the third lens group GR3 (eleventh surface and twelfth surface), the both surface of the positive lens L34 thereof (sixteenth surface and seventeenth face), the both surfaces of the positive lens L41 of the fourth lens group GR4 (twenty second surface and twenty third surface) are non-spherical. Table 2 presents the conic constants κ and the fourth-order, sixth-order, eighth-order and tenth-order non-spherical coefficients A4, A6, A8 and A10 of these surfaces. In addition, in Table 2 and the following other tables presenting non-spherical coefficients, the expression "E-i" is an exponential expression with a base of 10, that is, represents "$10^{-i}$". For example, the expression "0.12345E−05" represents "$0.12345 \times 10^{-5}$".

TABLE 2

| s i | κ | A4 | A6 | A8 | A10 |
|---|---|---|---|---|---|
| 4 | 0.00000E+00 | 5.68774E−06 | 8.94949E−07 | −8.70987E−09 | 2.31168E−11 |
| 5 | 4.98194E−01 | −1.50205E−04 | −1.88376E−07 | 1.80380E−08 | −4.16711E−10 |
| 8 | 0.00000E+00 | −1.61090E−04 | 1.30703E−06 | −6.58162E−08 | 1.47137E−09 |
| 9 | 0.00000E+00 | −1.12266E−04 | 1.08417E−06 | −7.49574E−08 | 1.47894E−09 |
| 11 | 0.00000E+00 | −1.13976E−06 | 5.69912E−07 | −4.23240E−09 | 0.00000E+00 |
| 12 | 0.00000E+00 | 5.53452E−05 | 6.07857E−07 | −8.21684E−09 | 0.00000E+00 |
| 16 | 0.00000E+00 | −1.34309E−04 | 8.36085E−06 | −3.07464E−08 | 0.00000E+00 |
| 17 | −2.15800E+01 | −1.00000E+01 | −9.35952E−05 | 9.86885E−06 | −2.66219E−08 |
| 22 | −3.11324E−01 | 3.76073E−05 | −1.57738E−06 | 3.04430E−08 | −1.89579E−10 |
| 23 | −1.00000E+01 | 6.45328E−05 | −2.99249E−06 | 5.18262E−08 | −3.12112E−10 |

Table 3 presents the focal lengths f, F values Fno and half FOVs ω at the wide-angle end, at the intermediate focal length and at the telescopic end in Example 1 of Numerical Values.

TABLE 3

| | Wide-Angle End | Intermediate Focal Length | Telescopic End |
|---|---|---|---|
| f | 9.58 | 19.82 | 41.00 |
| Fno | 1.87 | 2.49 | 3.30 |
| ω | 41.41 | 21.75 | 10.56 |

In the zoom lens according to Example 1 of Numerical Values, in zooming between the wide-angle end and telescopic end in the normal mode, a spacing d3 between the first lens group GR1 and second lens group GR2, a spacing d9 between the second lens group GR2 and third lens group GR3, a spacing d19 between the positive lens L35 and negative lens L36, a spacing d21 between the third lens group GR3 and fourth lens group GR4 and a spacing d23 between the fourth lens group GR4 and filter SG vary, where the subject distance is infinity. Table 4 presents the variable spacings with respect to the respective spacings at the wide-angle end, at the intermediate focal length and at the telescopic end in this case.

TABLE 4

| Normal Mode (Infinity) | Wide-Angle End | Intermediate Focal Length | Telescopic End |
|---|---|---|---|
| Subject Distance | Infinity | Infinity | Infinity |
| d 3 | 0.500 | 9.801 | 18.240 |
| d 9 | 16.030 | 6.684 | 2.600 |
| d 19 | 1.100 | 1.100 | 1.100 |
| d 21 | 5.500 | 7.686 | 22.843 |
| d 23 | 8.143 | 10.669 | 5.800 |

Moreover, in the zoom lens according to Example 1 of Numerical Values, in zooming between the wide-angle end and telescopic end in the normal mode, a spacing d19 between the positive lens L35 and negative lens L36, a spacing d21 between the third lens group GR3 and fourth lens group GR4 and a spacing d23 between the fourth lens group GR4 and filter SG vary, where the subject distance is close. Table 5 presents the variable spacings with respect to the respective spacings at the wide-angle end, at the intermediate focal length and at the telescopic end in this case.

TABLE 5

| Normal Mode (Close) | Wide-Angle End | Intermediate Focal Length | Telescopic End |
|---|---|---|---|
| Subject Distance | 50 mm | 200 mm | 800 mm |
| d 19 | 4.873 | 4.398 | 3.338 |
| d 21 | 1.727 | 4.388 | 20.606 |
| d 23 | 6.143 | 10.669 | 5.800 |

Moreover, in the zoom lens according to Example 1 of Numerical Values, in zooming between the wide-angle end and telescopic end in the macro mode, a spacing d19 between the positive lens L35 and negative lens L36, a spacing d21 between the third lens group GR3 and fourth lens group GR4 and a spacing d23 between the fourth lens group GR4 and filter SG vary, where the subject distance is close. Table 6 presents the variable spacings with respect to the respective spacings at the wide-angle end, at the intermediate focal length and at the telescopic end in this case.

TABLE 6

| Macro Mode (Close) | Wide-Angle End | Intermediate Focal Length | Telescopic End |
|---|---|---|---|
| Subject Distance | 40 mm | 150 mm | 300 mm |
| d 19 | 5.406 | 4.618 | 4.896 |
| d 21 | 0.953 | 3.398 | 15.217 |
| d 23 | 6.385 | 11.439 | 9.630 |

9. Ninth Embodiment

[Lens Configuration]

Figure 9:
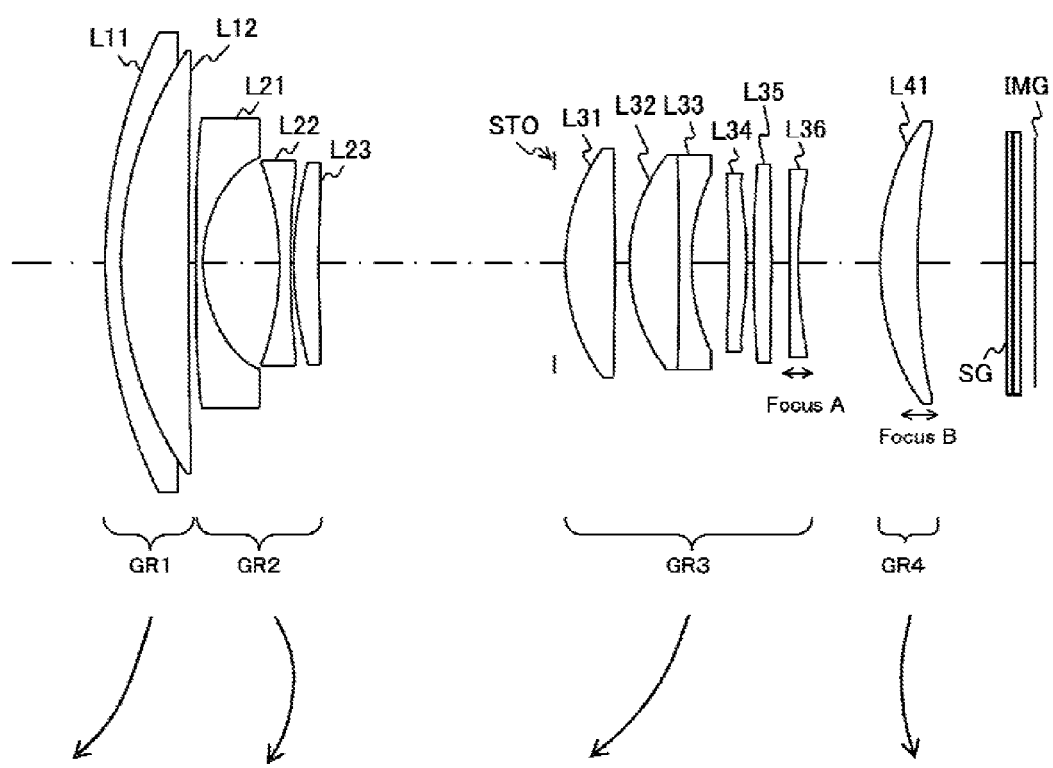
FIG. 9 is a diagram illustrating a lens configuration of a zoom lens according to a ninth embodiment of the present technology.

FIG. 9 is a diagram illustrating a lens configuration of a zoom lens according to a ninth embodiment of the present technology. The zoom lens according to the ninth embodiment includes, in the order from the object side, a first zoom lens group GR1 having positive refractive power, a second zoom lens group GR2 having negative refractive power, a third zoom lens group GR3 having positive refractive power and a fourth zoom lens group GR4 having positive refractive power.

The first zoom lens group GR1 includes a cemented lens configured by joining, in the order from the object side to the image side, a meniscus-shaped negative lens L11 concave to the image side and a meniscus-shaped positive lens L12 convex to the object side.

The second zoom lens group GR2 is configured by arranging a meniscus-shaped negative lens L21 concave to the image side, a negative lens L22 and a meniscus-shaped positive lens L23 convex to the object side in the order from the object side to the image side.

The third zoom lens group GR3 is configured by arranging a positive lens L31, a cemented lens configured of a positive lens L32 and a negative lens L33, a meniscus-shaped positive lens L34 convex to the image side, a positive lens L35 and a meniscus-shaped negative lens L36 concave to the image side in the order from the object side to the image side.

The fourth zoom lens group GR4 includes a meniscus-shaped positive lens L41 convex to the object side.

An opening aperture stop STO is disposed on the object side of the third zoom lens group GR3. Moreover, a filter SG is disposed between the fourth zoom lens group GR4 and an image plane IMG.

The zoom lens employs the floating focus system in which focus lens groups A and B move in association with each other in focusing, where the focus lens group A corresponds to the negative lens L36 and the focus lens group B corresponds to the positive lens L41. In focusing from a long distance to a short distance, the focus lens groups A and B move in orientation to the image side along the optical axis. Relative relationship between lens movement distances of the focus lens groups A and B in focusing changes at each zoom position. Moreover, the lens movement distances of the focus lens groups A and B in focusing meet linearity for both of them.

Moreover, as to the zoom lens, before and after switching between the normal mode and macro mode, the relative position between the negative lens L36 of the third zoom lens group GR3 and the positive lens L41 of the fourth zoom lens group GR4 changes. Moreover, before and after the switching between the normal mode and macro mode, a lens to rule focusing changes between the negative lens L36 of the third zoom lens group GR3 and the positive lens L41 of the fourth zoom lens group GR4.

[Specifications of Zoom Lens]

Table 7 presents data of the lenses in Example 2 of Numerical Values, in which specific numerical values are applied to the zoom lens according to the ninth embodiment.

TABLE 7

| s i | r i | d i | n i | v i |
|---|---|---|---|---|
| 1 | 35.292 | 1.000 | 1.92286 | 20.880 |
| 2 | 24.730 | 4.620 | 1.77250 | 49.624 |
| 3 | 460.000 | (d 3) | | |
| 4 (ASP) | 417.077 | 0.500 | 1.75501 | 51.158 |
| 5 (ASP) | 9.236 | 5.210 | | |
| 6 | −20.000 | 0.750 | 1.72916 | 54.674 |
| 7 | 53.460 | 0.250 | | |
| 8 (ASP) | 19.876 | 1.700 | 2.00170 | 19.324 |
| 9 (ASP) | 79.216 | (d 9) | | |
| STO | INFINITY | 0.800 | | |
| 11 (ASP) | 13.353 | 3.380 | 1.55332 | 71.685 |
| 12 (ASP) | −85.000 | 1.000 | | |
| 13 | 12.000 | 3.430 | 1.59201 | 67.023 |
| 14 | −150.000 | 0.770 | 1.80518 | 25.456 |
| 15 | 14.483 | 2.600 | | |
| 16 (ASP) | −54.311 | 1.200 | 1.72903 | 54.041 |
| 17 (ASP) | −22.075 | 0.500 | | |
| 18 | 96.346 | 1.120 | 1.72916 | 54.674 |
| 19 | −204.796 | (d 19) | | |
| 20 | 254.066 | 0.700 | 1.72916 | 54.674 |
| 21 | 35.398 | (d 21) | | |
| 22 (ASP) | 17.900 | 2.650 | 1.52470 | 56.460 |
| 23 (ASP) | 50.314 | (d 23) | | |
| 24 | INFINITY | 0.300 | 1.51680 | 64.200 |
| 25 | INFINITY | 0.150 | | |
| 26 | INFINITY | 0.500 | 1.51680 | 64.200 |
| 27 | INFINITY | 1.000 | | |
| IMG | INFINITY | | | |

In the zoom lens according to Example 2 of Numerical Values, the both surfaces of the negative lens L21 of the second lens group GR2 (fourth surface and fifth surface), the both surfaces of the positive lens L23 thereof (eighth surface and ninth surface), the both surfaces of the positive lens L31 of the third lens group GR3 (eleventh surface and twelfth surface), the both surface of the positive lens L34 thereof (sixteenth surface and seventeenth face), the both surfaces of the positive lens L41 of the fourth lens group GR4 (twenty second surface and twenty third surface) are non-spherical. Table 8 presents the conic constants κ and the fourth-order, sixth-order, eighth-order and tenth-order non-spherical coefficients A4, A6, A8 and A10 of these surfaces.

TABLE 8

| s i | κ | A4 | A6 | A8 | A10 |
|---|---|---|---|---|---|
| 4 | 0.00000E+00 | 2.68927E−05 | 4.58592E−07 | −4.96505E−09 | 1.09563E−11 |
| 5 | 5.35382E−01 | −1.35919E−04 | −1.80358E−07 | 1.26895E−08 | −4.71179E−10 |
| 8 | 0.00000E+00 | −1.82882E−04 | 2.57794E−06 | −1.01722E−07 | 1.74029E−09 |
| 9 | 0.00000E+00 | −1.28821E−04 | 2.09141E−06 | −1.02404E−07 | 1.65471E−09 |
| 11 | 0.00000E+00 | −1.02914E−06 | 5.51640E−07 | −4.17771E−09 | 0.00000E+00 |

TABLE 8-continued

| s i | κ | A4 | A6 | A8 | A10 |
|---|---|---|---|---|---|
| 12 | 0.00000E+00 | 5.18094E−05 | 5.79805E−07 | −7.91635E−09 | 0.00000E+00 |
| 16 | 0.00000E+00 | −1.66166E−04 | 7.63647E−06 | −4.89314E−09 | 0.00000E+00 |
| 17 | −1.00000E+01 | −1.18319E−04 | 9.05970E−06 | −6.96278E−09 | 9.36699E−10 |
| 22 | −5.18353E−01 | 4.17851E−05 | −8.46723E−07 | 1.48650E−08 | −5.92557E−11 |
| 23 | −2.86078E+00 | 5.32387E−05 | −2.05218E−08 | 3.23863E−08 | −1.54194E−10 |

Table 9 presents the focal lengths f, F values Fno and half FOVs ω at the wide-angle end, at the intermediate focal length and at the telescopic end in Example 2 of Numerical Values.

TABLE 9

| | Wide-Angle End | Intermediate Focal Length | Telescopic End |
|---|---|---|---|
| f | 9.58 | 19.82 | 41.00 |
| Fno | 1.87 | 2.27 | 3.01 |
| ω | 41.42 | 21.79 | 10.57 |

In the zoom lens according to Example 2 of Numerical Values, in zooming between the wide-angle end and telescopic end in the normal mode, a spacing d3 between the first lens group GR1 and second lens group GR2, a spacing d9 between the second lens group GR2 and third lens group GR3, a spacing d19 between the positive lens L35 and negative lens L36, a spacing d21 between the third lens group GR3 and fourth lens group GR4 and a spacing d23 between the fourth lens group GR4 and filter SG vary, where the subject distance is infinity. Table 10 presents the variable spacings with respect to the respective spacings at the wide-angle end, at the intermediate focal length and at the telescopic end in this case.

TABLE 10

| Normal Mode (Infinity) | Wide-Angle End | Intermediate Focal Length | Telescopic End |
|---|---|---|---|
| Subject Distance | Infinity | Infinity | Infinity |
| d 3 | 0.500 | 9.621 | 18.326 |
| d 9 | 16.080 | 6.653 | 2.600 |
| d 19 | 1.200 | 1.200 | 1.200 |
| d 21 | 5.497 | 7.743 | 22.708 |
| d 23 | 6.030 | 10.505 | 5.800 |

Moreover, in the zoom lens according to Example 2 of Numerical Values, in zooming between the wide-angle end and telescopic end in the normal mode, a spacing d19 between the positive lens L35 and negative lens L36, a spacing d21 between the third lens group GR3 and fourth lens group GR4 and a spacing d23 between the fourth lens group GR4 and filter SG vary, where the subject distance is close. Table 11 presents the variable spacings with respect to the respective spacings at the wide-angle end, at the intermediate focal length and at the telescopic end in this case.

TABLE 11

| Normal Mode (Close) | Wide-Angle End | Intermediate Focal Length | Telescopic End |
|---|---|---|---|
| Subject Distance | 50 mm | 200 mm | 800 mm |
| d 19 | 4.268 | 4.354 | 4.698 |
| d 21 | 2.186 | 4.327 | 21.126 |
| d 23 | 6.000 | 9.551 | 1.003 |

Moreover, in the zoom lens according to Example 2 for the numerical values, in zooming between the wide-angle end and telescopic end in the macro mode, a spacing d19 between the positive lens L35 and negative lens L36, a spacing d21 between the third lens group GR3 and fourth lens group GR4 and a spacing d23 between the fourth lens group GR4 and filter SG vary, where the subject distance is close. Table 12 presents the variable spacings with respect to the respective spacings at the wide-angle end, at the intermediate focal length and at the telescopic end in this case.

TABLE 12

| Macro Mode (Close) | Wide-Angle End | Intermediate Focal Length | Telescopic End |
|---|---|---|---|
| Subject Distance | 40 mm | 150 mm | 300 mm |
| d 19 | 4.944 | 4.285 | 4.495 |
| d 21 | 1.506 | 3.918 | 15.736 |
| d 23 | 6.276 | 11.245 | 9.477 |

10. Tenth Embodiment

[Lens Configuration]

Figure 10:
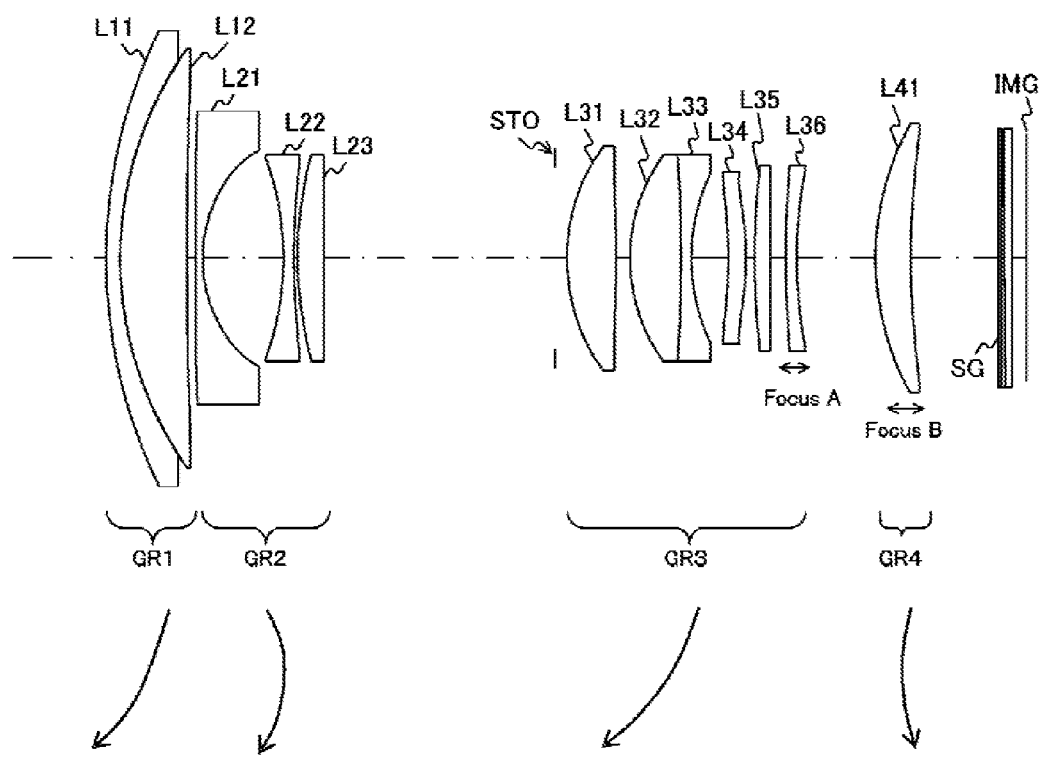
FIG. 10 is a diagram illustrating a lens configuration of a zoom lens according to a tenth embodiment of the present technology.

FIG. 10 is a diagram illustrating a lens configuration of a zoom lens according to a tenth embodiment of the present technology. The zoom lens according to the tenth embodiment includes, in the order from the object side, a first zoom lens group GR1 having positive refractive power, a second zoom lens group GR2 having negative refractive power, a third zoom lens group GR3 having positive refractive power and a fourth zoom lens group GR4 having positive refractive power.

The first zoom lens group GR1 includes a cemented lens configured by joining, in the order from the object side to the image side, a meniscus-shaped negative lens L11 concave to the image side and a meniscus-shaped positive lens L12 convex to the object side.

The second zoom lens group GR2 is configured by arranging a meniscus-shaped negative lens L21 concave to the image side, a negative lens L22 and a meniscus-shaped positive lens L23 convex to the object side in the order from the object side to the image side.

The third zoom lens group GR3 is configured by arranging a positive lens L31, a cemented lens configured of a positive lens L32 and a negative lens L33, a meniscus-shaped positive lens L34 convex to the image side, a positive lens L35 and a meniscus-shaped negative lens L36 concave to the image side in the order from the object side to the image side.

The fourth zoom lens group GR4 includes a meniscus-shaped positive lens L41 convex to the object side.

An opening aperture stop STO is disposed on the object side of the third zoom lens group GR3. Moreover, a filter SG is disposed between the fourth zoom lens group GR4 and an image plane IMG.

The zoom lens employs the floating focus system in which focus lens groups A and B move in association with each other in focusing, where the focus lens group A corresponds to the negative lens L36 and the focus lens group B corresponds to the positive lens L41. In focusing from a long distance to a short distance, the focus lens groups A and B move in orientation to the image side along the optical axis. Relative relationship between lens movement distances of the focus lens groups A and B in focusing changes at each zoom position. Moreover, the lens movement distances of the focus lens groups A and B in focusing meet linearity for both of them.

Moreover, as to the zoom lens, before and after switching between the normal mode and macro mode, the relative position between the negative lens L36 of the third zoom lens group GR3 and the positive lens L41 of the fourth zoom lens group GR4 changes. Moreover, before and after the switching between the normal mode and macro mode, a lens to rule focusing changes between the negative lens L36 of the third zoom lens group GR3 and the positive lens L41 of the fourth zoom lens group GR4.

[Specifications of Zoom Lens]

Table 13 presents data of the lenses in Example 3 of Numerical Values, in which specific numerical values are applied to the zoom lens according to the tenth embodiment.

TABLE 13

| s i | r i | d i | n i | v i |
|---|---|---|---|---|
| 1 | 34.966 | 1.000 | 1.92286 | 20.880 |
| 2 | 24.500 | 4.620 | 1.77250 | 49.624 |
| 3 | 610.465 | (d 3) | | |
| 4 (ASP) | 750.000 | 0.500 | 1.75501 | 51.158 |
| 5 (ASP) | 9.233 | 5.551 | | |
| 6 | −20.500 | 0.750 | 1.72916 | 54.674 |
| 7 | 70.000 | 0.250 | | |
| 8 (ASP) | 22.710 | 1.700 | 2.00170 | 19.324 |
| 9 (ASP) | 112.921 | (d 9) | | |
| STO | INFINITY | 0.800 | | |
| 11 (ASP) | 12.820 | 3.380 | 1.55332 | 71.685 |
| 12 (ASP) | −85.00 | 1.000 | | |
| 13 | 12.000 | 3.430 | 1.59201 | 67.023 |
| 14 | −150.000 | 0.800 | 1.80518 | 25.456 |
| 15 | 14.132 | 2.556 | | |
| 16 (ASP) | −26.674 | 1.200 | 1.72903 | 54.041 |
| 17 (ASP) | −18.739 | 0.500 | | |
| 18 | 50.000 | 1.134 | 1.72916 | 54.674 |
| 19 | −380.000 | (d 19) | | |
| 20 | 123.039 | 0.700 | 1.72916 | 54.674 |

TABLE 13-continued

| s i | r i | d i | n i | v i |
|---|---|---|---|---|
| 21 | 35.396 | (d 21) | | |
| 22 (ASP) | 19.054 | 2.416 | 1.52470 | 56.460 |
| 23 (ASP) | 50.000 | (d 23) | | |
| 24 | INFINITY | 0.300 | 1.51880 | 64.200 |
| 25 | INFINITY | 0.150 | | |
| 26 | INFINITY | 0.500 | 1.51680 | 64.200 |
| 27 | INFINITY | 1.000 | | |
| IMG | INFINITY | | | |

In the zoom lens according to Example 3 of Numerical Values, the both surfaces of the negative lens L21 of the second lens group GR2 (fourth surface and fifth surface), the both surfaces of the positive lens L23 thereof (eighth surface and ninth surface), the both surfaces of the positive lens L31 of the third lens group GR3 (eleventh surface and twelfth surface), the both surface of the positive lens L34 thereof (sixteenth surface and seventeenth face), the both surfaces of the positive lens L41 of the fourth lens group GR4 (twenty second surface and twenty third surface) are non-spherical. Table 14 presents the conic constants κ and the fourth-order, sixth-order, eighth-order and tenth-order non-spherical coefficients A4, A6, A8 and A10 of these surfaces.

TABLE 14

| s i | κ | A4 | A6 | A8 | A10 |
|---|---|---|---|---|---|
| 4 | 0.00000E+00 | −3.26147E−05 | 1.18902E−06 | −9.36139E−09 | 2.28042E−11 |
| 5 | 4.24825E−01 | −1.70167E−04 | −1.00884E−07 | 5.90646E−09 | −1.94617E−10 |
| 8 | 0.00000E+00 | −1.12903E−04 | 9.59931E−07 | −6.27631E−08 | 1.34451E−09 |
| 9 | 0.00000E+00 | −7.95713E−05 | 9.19520E−07 | −7.11901E−08 | 1.34663E−09 |
| 11 | 0.00000E+00 | −1.67897E−06 | 6.70181E−07 | −5.60053E−09 | 0.00000E+00 |
| 12 | 0.00000E+00 | 5.73134E−05 | 6.19238E−07 | −8.94302E−09 | 0.00000E+00 |
| 16 | 0.00000E+00 | −1.16142E−04 | 8.49835E−06 | −2.16854E−08 | 0.00000E+00 |
| 17 | −1.00000E+01 | −1.38214E−04 | 1.12301E−05 | −4.70735E−08 | 1.42474E−09 |
| 22 | −1.37619E+00 | 8.75576E−05 | −2.66080E−06 | 4.06868E−08 | −2.05393E−10 |
| 23 | −1.00000E+01 | 1.07414E−04 | −4.70700E−06 | 6.96764E−08 | −3.57224E−10 |

Table 15 presents the focal lengths f, F values Fno and half FOVs ω at the wide-angle end, at the intermediate focal length and at the telescopic end in Example 3 of Numerical Values.

TABLE 15

| | Wide-Angle End | Intermediate Focal Length | Telescopic End |
|---|---|---|---|
| f | 9.58 | 18.55 | 35.91 |
| Fno | 1.87 | 2.23 | 2.89 |
| ω | 41.25 | 23.00 | 11.95 |

In the zoom lens according to Example 3 of Numerical Values, in zooming between the wide-angle end and telescopic end in the normal mode, a spacing d3 between the first lens group GR1 and second lens group GR2, a spacing d9 between the second lens group GR2 and third lens group GR3, a spacing d19 between the positive lens L35 and negative lens L36, a spacing d21 between the third lens group GR3 and fourth lens group GR4 and a spacing d23 between the fourth lens group GR4 and filter SG vary, where the subject distance is infinity. Table 16 presents the variable spacings with respect to the respective spacings at the wide-angle end, at the intermediate focal length and at the telescopic end in this case.

TABLE 16

| Normal Mode (Infinity) | Wide-Angle End | Intermediate Focal Length | Telescopic End |
|---|---|---|---|
| Subject Distance | Infinity | Infinity | Infinity |
| d 3 | 0.500 | 8.520 | 16.100 |
| d 9 | 15.900 | 7.020 | 2.700 |
| d 19 | 1.100 | 1.100 | 1.100 |
| d 21 | 5.354 | 7.580 | 20.227 |
| d 23 | 6.000 | 9.551 | 5.500 |

Moreover, in the zoom lens according to Example 3 of Numerical Values, in zooming between the wide-angle end and telescopic end in the normal mode, a spacing d19 between the positive lens L35 and negative lens L36, a spacing d21 between the third lens group GR3 and fourth lens group GR4 and a spacing d23 between the fourth lens group GR4 and filter SG vary, where the subject distance is close. Table 17 presents the variable spacings with respect to the respective spacings at the wide-angle end, at the intermediate focal length and at the telescopic end in this case.

TABLE 17

| Normal Mode (Close) | Wide-Angle End | Intermediate Focal Length | Telescopic End |
|---|---|---|---|
| Subject Distance | 50 mm | 200 mm | 800 mm |
| d 19 | 5.315 | 4.355 | 3.150 |
| d 21 | 1.139 | 4.325 | 18.177 |
| d 23 | 6.000 | 9.551 | 5.500 |

Moreover, in the zoom lens according to Example 3 of Numerical Values, in zooming between the wide-angle end and telescopic end in the macro mode, a spacing d19 between the positive lens L35 and negative lens L36, a spacing d21 between the third lens group GR3 and fourth lens group GR4 and a spacing d23 between the fourth lens group GR4 and filter SG vary, where the subject distance is close. Table 18 presents the variable spacings with respect to the respective spacings at the wide-angle end, at the intermediate focal length and at the telescopic end in this case.

TABLE 18

| Macro Mode (Close) | Wide-Angle End | Intermediate Focal Length | Telescopic End |
|---|---|---|---|
| Subject Distance | 40 mm | 150 mm | 250 mm |
| d 19 | 5.910 | 4.581 | 5.545 |
| d 21 | 0.278 | 3.342 | 12.447 |
| d 23 | 6.266 | 10.308 | 8.835 |

11. Eleventh Embodiment

[Lens Configuration]

Figure 11:
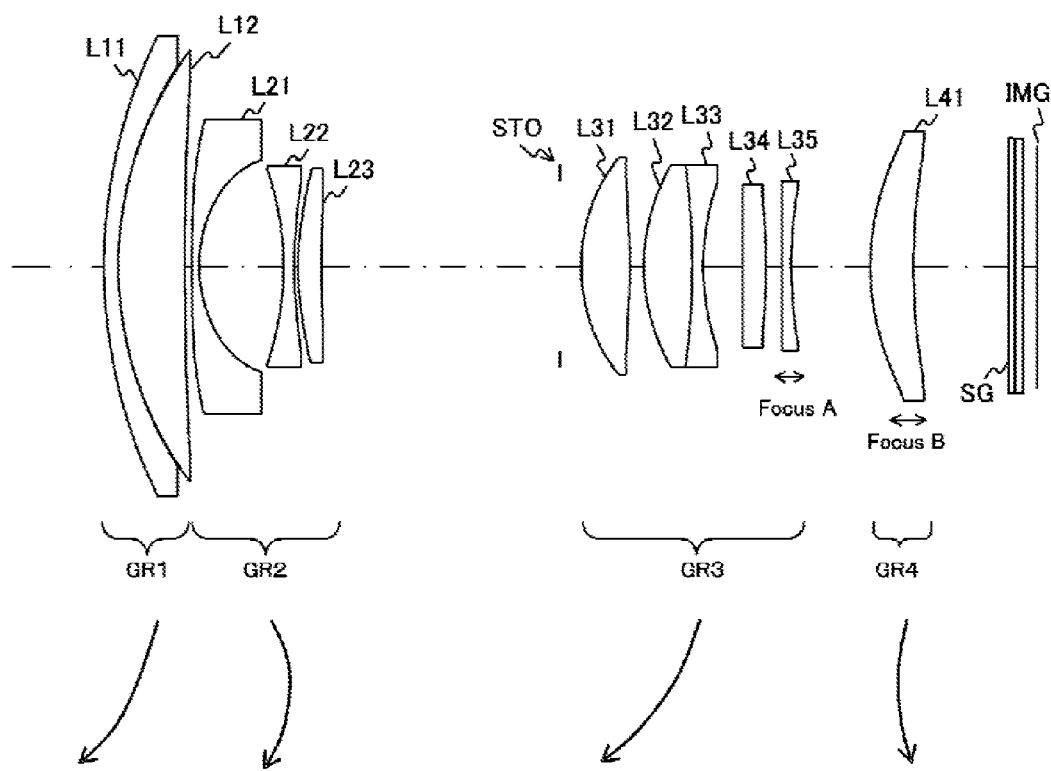
FIG. 11 is a diagram illustrating a lens configuration of a zoom lens according to an eleventh embodiment of the present technology.

FIG. 11 is a diagram illustrating a lens configuration of a zoom lens according to an eleventh embodiment of the present technology. The zoom lens according to the eleventh embodiment includes, in the order from the object side, a first zoom lens group GR1 having positive refractive power, a second zoom lens group GR2 having negative refractive power, a third zoom lens group GR3 having positive refractive power and a fourth zoom lens group GR4 having positive refractive power.

The first zoom lens group GR1 includes a cemented lens configured by joining, in the order from the object side to the image side, a meniscus-shaped negative lens L11 concave to the image side and a meniscus-shaped positive lens L12 convex to the object side.

The second zoom lens group GR2 is configured by arranging a meniscus-shaped negative lens L21 concave to the image side, a negative lens L22 and a meniscus-shaped positive lens L23 convex to the object side in the order from the object side to the image side.

The third zoom lens group GR3 is configured by arranging a positive lens L31, a cemented lens configured of a positive lens L32 and a negative lens L33, a meniscus-shaped positive lens L34 convex to the image side, a positive lens L35 and a meniscus-shaped negative lens L36 concave to the image side in the order from the object side to the image side. That is, different from the other embodiments, in the zoom lens according to the eleventh embodiment, the third zoom lens group GR 3 is configured to include five lenses.

The fourth zoom lens group GR4 includes a meniscus-shaped positive lens L41 convex to the object side.

An opening aperture stop STO is disposed on the object side of the third zoom lens group GR3. Moreover, a filter SG is disposed between the fourth zoom lens group GR4 and an image plane IMG.

The zoom lens employs the floating focus system in which focus lens groups A and B move in association with each other in focusing, where the focus lens group A corresponds to the negative lens L35 and the focus lens group B corresponds to the positive lens L41. In focusing from a long distance to a short distance, the focus lens groups A and B move in orientation to the image side along the optical axis. Relative relationship between lens movement distances of the focus lens groups A and B in focusing changes at each zoom position. Moreover, the lens movement distances of the focus lens groups A and B in focusing meet linearity for both of them.

Moreover, as to the zoom lens, before and after switching between the normal mode and macro mode, the relative position between the negative lens L35 of the third zoom lens group GR3 and the positive lens L41 of the fourth zoom lens group GR4 changes. Moreover, before and after the switching between the normal mode and macro mode, a lens to rule focusing changes between the negative lens L35 of the third zoom lens group GR3 and the positive lens L41 of the fourth zoom lens group GR4.

[Specifications of Zoom Lens]

Table 19 presents data of the lenses in Example 4 of Numerical Values, in which specific numerical values are applied to the zoom lens according to the eleventh embodiment.

TABLE 19

| s i | r i | d i | n i | v i |
|---|---|---|---|---|
| 1 | 36.217 | 1.000 | 1.92286 | 20.880 |
| 2 | 25.483 | 4.650 | 1.77250 | 49.624 |
| 3 | 329.061 | (d 3) | | |
| 4 (ASP) | 337.902 | 0.500 | 1.75501 | 51.158 |
| 5 (ASP) | 10.083 | 5.800 | | |
| 6 | −21.269 | 0.780 | 1.72916 | 54.674 |
| 7 | 34.948 | 0.250 | | |
| 8 (ASP) | 18.476 | 1.720 | 2.00170 | 19.324 |
| 9 (ASP) | 59.801 | (d 9) | | |
| STO | INFINITY | 1.500 | | |
| 11 (ASP) | 12.500 | 3.400 | 1.55332 | 71.685 |
| 12 (ASP) | −72.83 | 1.000 | | |
| 13 | 13.668 | 3.450 | 1.59201 | 67.023 |
| 14 | −51.562 | 0.800 | 1.80518 | 25.456 |
| 15 | 18.817 | 2.725 | | |
| 16 (ASP) | −500.000 | 1.620 | 1.82080 | 42.706 |
| 17 (ASP) | −38.015 | (d 17) | | |
| 18 | 227.971 | 0.700 | 1.72916 | 54.674 |

TABLE 19-continued

| s i | r i | d i | n i | v i |
|---|---|---|---|---|
| 19 | 35.396 | (d 19) | | |
| 20 (ASP) | 18.361 | 3.000 | 1.52470 | 56.460 |
| 21 (ASP) | 47.800 | (d 21) | | |
| 22 | INFINITY | 0.300 | 1.51680 | 64.200 |
| 23 | INFINITY | 0.150 | | |
| 24 | INFINITY | 0.500 | 1.51680 | 64.200 |
| 25 | INFINITY | 1.000 | | |
| IMG | INFINITY | | | |

In the zoom lens according to Example 4 of Numerical Values, the both surfaces of the negative lens L21 of the second lens group GR2 (fourth surface and fifth surface), the both surfaces of the positive lens L23 thereof (eighth surface and ninth surface), the both surfaces of the positive lens L31 of the third lens group GR3 (eleventh surface and twelfth surface), the both surface of the positive lens L34 thereof (sixteenth surface and seventeenth face), the both surfaces of the positive lens L41 of the fourth lens group GR4 (twentieth surface and twenty first surface) are non-spherical. Table 20 presents the conic constants κ and the fourth-order, sixth-order, eighth-order and tenth-order non-spherical coefficients A4, A6, A8 and A10 of these surfaces.

TABLE 20

| s i | κ | A4 | A6 | A8 | A10 |
|---|---|---|---|---|---|
| 4 | 0.00000E+00 | 7.82620E−05 | 1.64608E−07 | −4.28811E−09 | 9.41066E−12 |
| 5 | 7.74682E−01 | −8.13657E−05 | 8.77360E−07 | −5.37107E−09 | 2.33725E−11 |
| 8 | 0.00000E+00 | −2.51889E−04 | 2.13844E−06 | −4.91089E−08 | 1.16589E−09 |
| 9 | 0.00000E+00 | −1.87944E−04 | 1.36811E−06 | −4.95772E−08 | 1.08858E−09 |
| 11 | 0.00000E+00 | 8.86948E−06 | 3.77057E−07 | 1.11725E−10 | 0.00000E+00 |
| 12 | 0.00000E+00 | 6.74001E−05 | 3.81661E−07 | −4.18748E−09 | 0.00000E+00 |
| 16 | 0.00000E+00 | −4.39021E−05 | 2.70052E−06 | −9.02502E−08 | 0.00000E+00 |
| 17 | 0.00000E+00 | 1.09128E−04 | 3.95697E−06 | −7.68377E−08 | 5.07392E−10 |
| 20 | −2.51276E+00 | 5.75944E−05 | −8.15026E−07 | 1.83878E−08 | −1.68050E−10 |
| 21 | 1.45502E+00 | 1.91363E−05 | −1.18572E−06 | 2.60741E−08 | −2.27002E−10 |

Table 21 presents the focal lengths f, F values Fno and half FOVs ω at the wide-angle end, at the intermediate focal length and at the telescopic end in Example 4 of Numerical Values.

TABLE 21

| | Wide-Angle End | Intermediate Focal Length | Telescopic End |
|---|---|---|---|
| f | 9.60 | 23.40 | 57.02 |
| Fno | 2.04 | 2.57 | 3.67 |
| ω | 41.44 | 18.46 | 7.55 |

In the zoom lens according to Example 4 of Numerical Values, in zooming between the wide-angle end and telescopic end in the normal mode, a spacing d3 between the first lens group GR1 and second lens group GR2, a spacing d9 between the second lens group GR2 and third lens group GR3, a spacing d17 between the positive lens L34 and negative lens L35, a spacing d19 between the third lens group GR3 and fourth lens group GR4 and a spacing d21 between the fourth lens group GR4 and filter SG vary, where the subject distance is infinity. Table 22 presents the variable spacings with respect to the respective spacings at the wide-angle end, at the intermediate focal length and at the telescopic end in this case.

TABLE 22

| Normal Mode (Infinity) | Wide-Angle End | Intermediate Focal Length | Telescopic End |
|---|---|---|---|
| Subject Distance | Infinity | Infinity | Infinity |
| d 3 | 0.500 | 12.311 | 23.238 |
| d 9 | 16.580 | 5.351 | 1.500 |
| d 17 | 1.100 | 1.100 | 1.100 |
| d 19 | 5.502 | 5.562 | 29.010 |
| d 21 | 6.658 | 14.590 | 6.000 |

Moreover, in the zoom lens according to Example 4 of Numerical Values, in zooming between the wide-angle end and telescopic end in the normal mode, a spacing d17 between the positive lens L34 and negative lens L35, a spacing d19 between the third lens group GR3 and fourth lens group GR4 and a spacing d21 between the fourth lens group GR4 and filter SG vary, where the subject distance is close. Table 23 presents the variable spacings with respect to the respective spacings at the wide-angle end, at the intermediate focal length and at the telescopic end in this case.

TABLE 23

| Normal Mode (Close) | Wide-Angle End | Intermediate Focal Length | Telescopic End |
|---|---|---|---|
| Subject Distance | 70 m | 250 mm | 850 mm |
| d 17 | 1.582 | 2.047 | 4.967 |
| d 19 | 5.358 | 4.614 | 28.763 |
| d 21 | 6.320 | 14.590 | 2.380 |

Moreover, in the zoom lens according to Example 4 of Numerical Values, in zooming between the wide-angle end and telescopic end in the macro mode, a spacing d17 between the positive lens L34 and negative lens L35, a spacing d19 between the third lens group GR3 and fourth lens group GR4 and a spacing d21 between the fourth lens group GR4 and filter SG vary, where the subject distance is close. Table 24 presents the variable spacings with respect to the respective spacings at the wide-angle end, at the intermediate focal length and at the telescopic end in this case.

TABLE 24

| Macro Mode (Close) | Wide-Angle End | Intermediate Focal Length | Telescopic End |
|---|---|---|---|
| Subject Distance | 35 mm | 200 mm | 400 mm |
| d 17 | 5.061 | 3.999 | 4.449 |
| d 19 | 1.301 | 1.775 | 19.336 |
| d 21 | 6.898 | 15.478 | 12.325 |

12. Twelfth Embodiment

[Lens Configuration]

Figure 12:
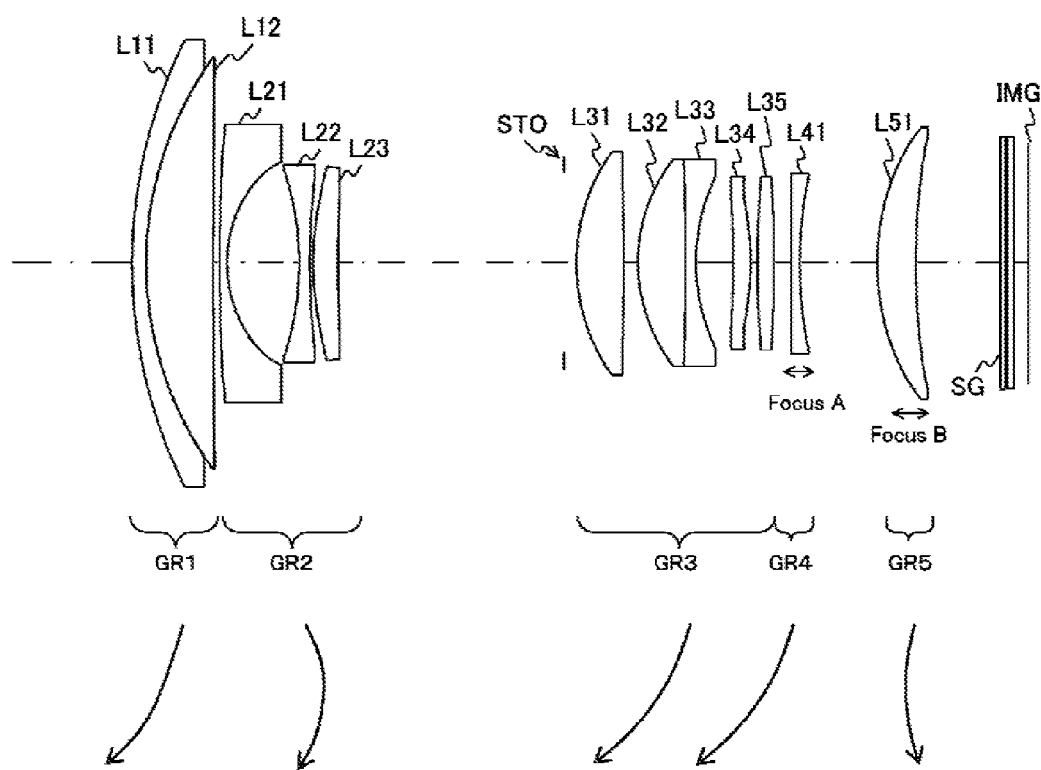
FIG. 12 is a diagram illustrating a lens configuration of a zoom lens according to a twelfth embodiment of the present technology.

FIG. 12 is a diagram illustrating a lens configuration of a zoom lens according to a twelfth embodiment of the present technology. The zoom lens according to the twelfth embodiment includes, in the order from the object side, a first zoom lens group GR1 having positive refractive power, a second zoom lens group GR2 having negative refractive power, a third zoom lens group GR3 having positive refractive power, a fourth zoom lens group GR4 having negative refractive power, and a fifth zoom lens group GR5 having positive refractive power.

The first zoom lens group GR1 includes a cemented lens configured by joining, in the order from the object side to the image side, a meniscus-shaped negative lens L11 concave to the image side and a meniscus-shaped positive lens L12 convex to the object side.

The second zoom lens group GR2 is configured by arranging a meniscus-shaped negative lens L21 concave to the image side, a negative lens L22 and a meniscus-shaped positive lens L23 convex to the object side in the order from the object side to the image side.

The third zoom lens group GR3 is configured by arranging a positive lens L31, a cemented lens configured of a positive lens L32 and a negative lens L33, a meniscus-shaped positive lens L34 convex to the image side and a positive lens L35 in the order from the object side to the image side.

The fourth zoom lens group GR4 includes a meniscus-shaped negative lens L41 concave to the image.

The fifth zoom lens group GR5 includes a meniscus-shaped positive lens L51 convex to the object side.

An opening aperture stop STO is disposed on the object side of the third zoom lens group GR3. Moreover, a filter SG is disposed between the fifth zoom lens group GR5 and an image plane IMG.

The zoom lens employs the floating focus system in which focus lens groups A and B move in association with each other in focusing, where the focus lens group A corresponds to the negative lens L41 and the focus lens group B corresponds to the positive lens L51. That is, different from the other embodiments, the focus lens group A is configured to be independent from the third lens groups GR3. In focusing from a long distance to a short distance, the focus lens groups A and B move in orientation to the image side along the optical axis. Relative relationship between lens movement distances of the focus lens groups A and B in focusing changes at each zoom position. Moreover, the lens movement distances of the focus lens groups A and B in focusing meet linearity for both of them.

Moreover, as to the zoom lens, before and after switching between the normal mode and macro mode, the relative position between the negative lens L41 of the fourth zoom lens group GR4 and the positive lens L51 of the fifth zoom lens group GR5 changes. Moreover, before and after the switching between the normal mode and macro mode, a lens to rule focusing changes between the negative lens L41 of the fourth zoom lens group GR4 and the positive lens L51 of the fifth zoom lens group GR5.

[Specifications of Zoom Lens]

Table 25 presents data of the lenses in Example 5 of Numerical Values, in which specific numerical values are applied to the zoom lens according to the twelfth embodiment.

TABLE 25

| s i | r i | d i | n i | ν i |
|---|---|---|---|---|
| 1 | 35.292 | 1.000 | 1.92286 | 20.880 |
| 2 | 24.730 | 4.620 | 1.77250 | 49.624 |
| 3 | 460.000 | (d 3) | | |
| 4 (ASP) | 393.196 | 0.500 | 1.75501 | 51.158 |
| 5 (ASP) | 9.228 | 5.219 | | |
| 6 | −20.000 | 0.750 | 1.72916 | 54.674 |
| 7 | 53.460 | 0.250 | | |
| 8 (ASP) | 19.883 | 1.700 | 2.00170 | 19.324 |
| 9 (ASP) | 79.274 | (d 9) | | |
| STO | INFINITY | 0.800 | | |
| 11 (ASP) | 13.350 | 3.380 | 1.55332 | 71.685 |
| 12 (ASP) | −85.00 | 1.000 | | |
| 13 | 12.000 | 3.430 | 1.59201 | 67.023 |
| 14 | −150.000 | 0.770 | 1.80518 | 25.456 |
| 15 | 14.476 | 2.600 | | |
| 16 (ASP) | −54.397 | 1.200 | 1.72903 | 54.041 |
| 17 (ASP) | −22.069 | 0.500 | | |
| 18 | 96.951 | 1.120 | 1.72916 | 54.674 |
| 19 | −202.079 | (d 19) | | |
| 20 | 259.721 | 0.700 | 1.72916 | 54.674 |
| 21 | 35.396 | (d 21) | | |
| 22 (ASP) | 17.900 | 2.650 | 1.52470 | 56.460 |
| 23 (ASP) | 50.602 | (d 23) | | |
| 24 | INFINITY | 0.300 | 1.51880 | 64.200 |
| 25 | INFINITY | 0.150 | | |
| 26 | INFINITY | 0.500 | 1.51680 | 64.200 |
| 27 | INFINITY | 1.000 | | |
| IMG | INFINITY | | | |

In the zoom lens according to Example 5 of Numerical Values, the both surfaces of the negative lens L21 of the second lens group GR2 (fourth surface and fifth surface), the both surfaces of the positive lens L23 thereof (eighth surface and ninth surface), the both surfaces of the positive lens L31 of the third lens group GR3 (eleventh surface and twelfth surface), the both surface of the positive lens L34 thereof (sixteenth surface and seventeenth face), the both surfaces of the positive lens L51 of the fifth lens group GR5 (twenty second surface and twenty third surface) are non-spherical. Table 26 presents the conic constants κ and the fourth-order, sixth-order, eighth-order and tenth-order non-spherical coefficients A4, A6, A8 and A10 of these surfaces.

TABLE 26

| s i | κ | A4 | A6 | A8 | A10 |
|---|---|---|---|---|---|
| 4 | 0.00000E+00 | 2.61659E−05 | 4.51425E−07 | −4.91223E−09 | 1.10079E−11 |
| 5 | 5.27845E−01 | −1.35553E−04 | −1.81011E−07 | 1.27051E−08 | −4.78410E−10 |
| 8 | 0.00000E+00 | −1.82519E−04 | 2.59145E−06 | −1.01496E−07 | 1.72052E−09 |
| 9 | 0.00000E+00 | −1.28611E−04 | 2.09350E−06 | −1.01562E−07 | 1.62898E−09 |
| 11 | 0.00000E+00 | −9.46873E−07 | 5.42585E−07 | −4.04856E−09 | 0.00000E+00 |
| 12 | 0.00000E+00 | 5.19703E−05 | 5.69377E−07 | −7.75606E−09 | 0.00000E+00 |
| 16 | 0.00000E+00 | −1.65699E−04 | 7.59077E−06 | −3.67694E−09 | 0.00000E+00 |
| 17 | −1.00000E+01 | −1.17997E−04 | 9.03391E−06 | −6.61906E−09 | 9.51441E−10 |

TABLE 26-continued

| s i | κ | A4 | A6 | A8 | A10 |
|---|---|---|---|---|---|
| 22 | −5.96821E−01 | 4.22180E−05 | −7.98499E−07 | 1.44316E−08 | −5.74748E−11 |
| 23 | 1.54855E+00 | 4.69605E−05 | −1.97526E−06 | 3.15109E−08 | −1.50527E−10 |

Table 27 presents the focal lengths f, F values Fno and half FOVs ω at the wide-angle end, at the intermediate focal length and at the telescopic end in Example 5 of Numerical Values.

TABLE 27

|  | Wide-Angle End | Intermediate Focal Length | Telescopic End |
|---|---|---|---|
| f | 9.58 | 19.82 | 41.00 |
| Fno | 1.87 | 2.26 | 3.00 |
| ω | 41.42 | 21.78 | 10.57 |

In the zoom lens according to Example 5 of Numerical Values, in zooming between the wide-angle end and telescopic end in the normal mode, a spacing d3 between the first lens group GR1 and second lens group GR2, a spacing d9 between the second lens group GR2 and third lens group GR3, a spacing d19 between the positive lens L35 and negative lens L41, a spacing d21 between the fourth lens group GR4 and fourth lens group GR5 and a spacing d23 between the fifth lens group GR5 and filter SG vary, where the subject distance is infinity. Table 28 presents the variable spacings with respect to the respective spacings at the wide-angle end, at the intermediate focal length and at the telescopic end in this case.

TABLE 28

| Normal Mode (Infinity) | Wide-Angle End | Intermediate Focal Length | Telescopic End |
|---|---|---|---|
| Subject Distance | Infinity | Infinity | Infinity |
| d 3 | 0.500 | 9.623 | 18.321 |
| d 9 | 16.080 | 6.649 | 2.600 |
| d 19 | 1.200 | 1.248 | 1.201 |
| d 21 | 5.497 | 7.731 | 22.719 |
| d 23 | 6.031 | 10.472 | 5.800 |

Moreover, in the zoom lens according to Example 5 of Numerical Values, in zooming between the wide-angle end and telescopic end in the normal mode, a spacing d19 between the positive lens L35 and negative lens L41, a spacing d21 between the fourth lens group GR4 and fifth lens group GR5 and a spacing d23 between the fifth lens group GR5 and filter SG vary, where the subject distance is close. Table 29 presents the variable spacings with respect to the respective spacings at the wide-angle end, at the intermediate focal length and at the telescopic end in this case.

TABLE 29

| Normal Mode (Close) | Wide-Angle End | Intermediate Focal Length | Telescopic End |
|---|---|---|---|
| Subject Distance | 50 mm | 200 mm | 800 mm |
| d 19 | 4.479 | 4.116 | 3.161 |
| d 21 | 2.218 | 4.863 | 20.759 |
| d 23 | 6.031 | 10.472 | 5.800 |

Moreover, in the zoom lens according to Example 5 of Numerical Values, in zooming between the wide-angle end and telescopic end in the macro mode, a spacing d19 between the positive lens L35 and negative lens L41, a spacing d21 between the fourth lens group GR4 and fifth lens group GR5 and a spacing d23 between the fifth lens group GR5 and filter SG vary, where the subject distance is close. Table 30 presents the variable spacings with respect to the respective spacings at the wide-angle end, at the intermediate focal length and at the telescopic end in this case.

TABLE 30

| Macro Mode (Close) | Wide-Angle End | Intermediate Focal Length | Telescopic End |
|---|---|---|---|
| Subject Distance | 40 mm | 150 mm | 300 mm |
| d 19 | 4.915 | 4.329 | 4.488 |
| d 21 | 1.537 | 3.935 | 15.761 |
| d 23 | 6.275 | 11.187 | 9.471 |

[Summary of Conditional Expressions]

Table 31 presents the values in Examples 1 to 5 of Numerical Values according to the eighth to twelfth embodiments, where the shift lens group is a lens group moving (shifting) in switching between the normal mode and macro mode and its role is ruled by the focus lens group B in any of Examples 1 to 5 of Numerical Values in the figures. It is apparent from the values that the conditional expressions (a) to (b) are satisfied.

TABLE 31

|  |  | Example 1 | Example 2 | Example 3 | Example 4 | Example 5 |
|---|---|---|---|---|---|---|
| Conditional Expression (a) | $|D_{macro\_w}|/fw$ | 0.025 | 0.026 | 0.028 | 0.025 | 0.026 |
| Conditional Expression (b) | $|D_{macro\_t}|/ft$ | 0.093 | 0.090 | 0.093 | 0.111 | 0.090 |
|  | $|D_{macro\_w}|$ | 0.242 | 0.247 | 0.266 | 0.240 | 0.245 |
|  | $|D_{macro\_t}|$ | 3.830 | 3.677 | 3.335 | 6.325 | 3.671 |
|  | fw | 9.58 | 9.58 | 9.58 | 9.60 | 9.58 |
|  | ft | 41.00 | 41.00 | 35.91 | 57.02 | 41.00 |
|  | Shift Lens Group | Focus B | Focus B | Focus B | Focus B | Focus B |

13. Application Example

[Configuration of Image Capturing Apparatus]

Figure 13:
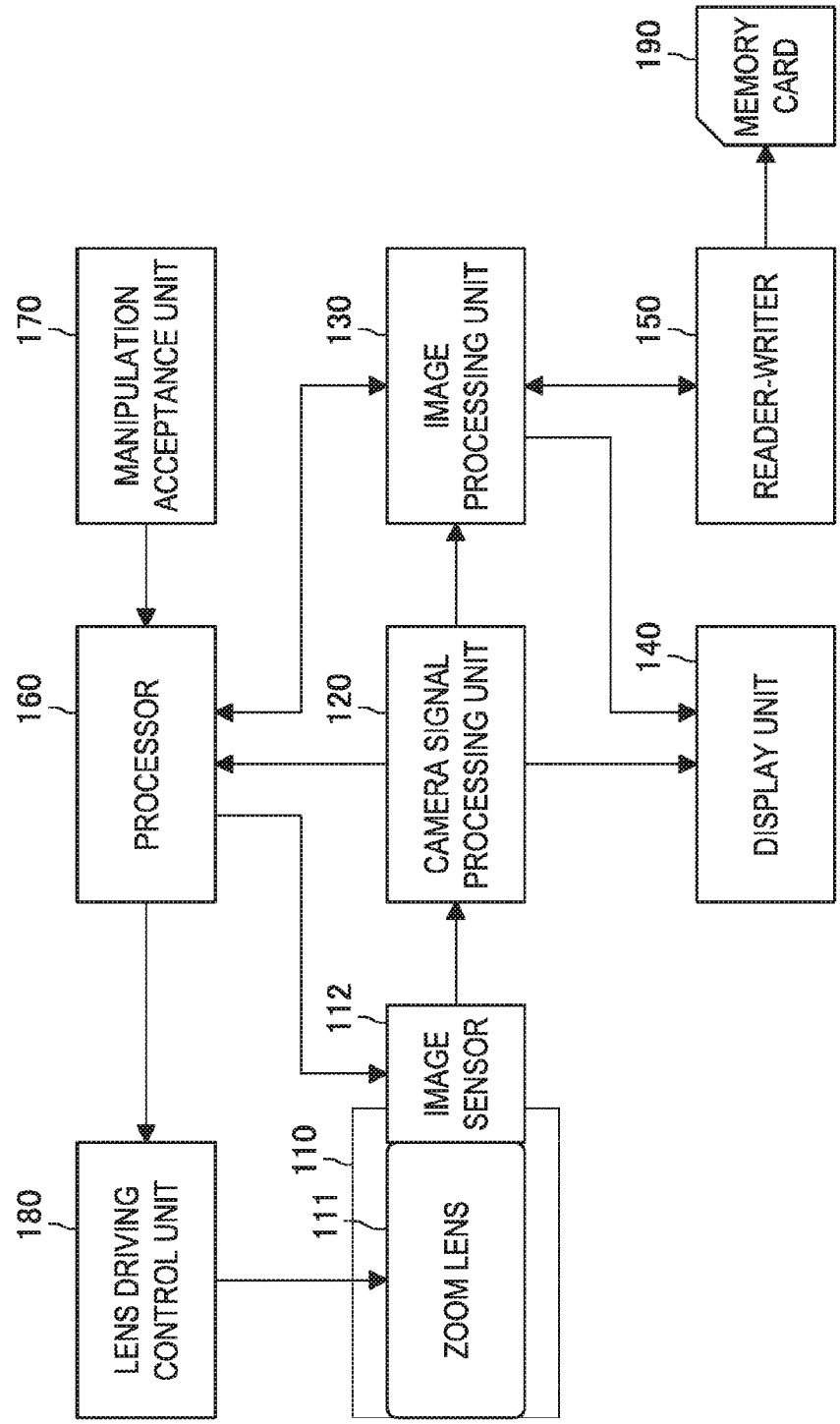
FIG. 13 is a diagram illustrating an image capturing apparatus 100 to which any of the zoom lenses according to the first to twelfth embodiments of the present technology is applied.

FIG. 13 is a diagram illustrating an example of an image capturing apparatus 100 to which the zoom lens according to any of the first to twelfth embodiments of the present technology. The image capturing apparatus 100 includes a camera block 110, a camera signal processing unit 120, an image processing unit 130, a display unit 140, a reader-writer 150, a processor 160, a manipulation acceptance unit 170 and a lens driving control unit 180.

The camera block 110 takes on an image capturing function, and includes a zoom lens 111 according to any of the first to twelfth embodiments and an image sensor 112 converting an optical image formed by the zoom lens 111 into an electric signal. The image sensor 112 can employ a photoelectric transducer such, for example, as a CCD (Charge Coupled Device) and CMOS (Complementary Metal-Oxide Semiconductor). The zoom lens 111 is herein simply illustrated as a single lens, which indicates the lens groups according to any of the first to twelfth embodiments.

The camera signal processing unit 120 performs signal processing such as analog-digital conversion on a captured image signal. The camera signal processing unit 120 converts an output signal from the image sensor 112 into a digital signal. Moreover, the camera signal processing unit 120 performs various kinds of signal processing such as noise reduction, image quality correction, conversion into luminance-chromaticity signals.

The image processing unit 130 performs recording/playing-back processing of the image signal. The image processing unit 130 performs compression encoding and decompression decoding of the image signal based on a predetermined image data format and conversion of data specifications such as resolution.

The display unit 140 displays the captured image and the like. The display unit 140 has a function of displaying a manipulation status in the manipulation acceptance unit 170 and various kinds of data of the captured image and the like. The display unit 140 can include, for example, a liquid crystal display (LCD).

The reader-writer 150 performs access to the memory card 190 which access is writing and read-out of the image signal. The reader-writer 150 writes the image data encoded by the image processing unit 130 to the memory card 190, and reads out the image data recorded in the memory card 190. The memory card 190 is, for example, a semiconductor memory removable to the slot connected to the reader-writer 150.

The processor 160 controls the whole image capturing apparatus. The processor 160 functions as a control processing unit controlling the individual circuit blocks provided in the image capturing apparatus 100, and controls the individual circuit blocks based on manipulation instruction signals from the manipulation acceptance unit 170.

The manipulation acceptance unit 170 accepts manipulation from the user. The manipulation acceptance unit 170 can implemented, for example, by a shutter release button for performing shutter operation, a selection switch for selecting an operation mode, and the like. For example, mode selection of selecting any one of the normal mode and macro mode can be accepted by the manipulation acceptance unit 170. The manipulation instruction signal accepted by the manipulation acceptance unit 170 is supplied to the processor 160.

The lens driving control unit 180 controls driving of the lenses disposed in the camera block 110. The lens driving control unit 180 controls a motor and the like (not illustrated in the figure) for driving the lenses of the zoom lens 111 based on the control signals from the processor 160.

In standing-by for image capturing, the image capturing apparatus 100 outputs the image signal captured by the camera block 110 via the camera signal processing unit 120 to the display unit 140 under the control of the processor 160, and displays it as a camera-through image. Moreover, upon acceptance of the manipulation instruction signal for zooming in the manipulation acceptance unit 170, the processor 160 outputs the control signal to the lens driving control unit 180, predetermined lenses in the zoom lens 111 are moved based on the control of the lens driving control unit 180.

Upon acceptance of the shutter manipulation in the manipulation acceptance unit 170, the captured image signal is outputted from the camera signal processing unit 120 to the image processing unit 130 to undergo compression encoding and conversion into digital data in a predetermined format. The converted data is outputted to the reader-writer 150 and written in the memory card 190.

Focusing is performed, for example, on the occasions such as a half push of the shutter release button and a full push thereof for recording (image capturing) in the manipulation acceptance unit 170. In this case, the lens driving control unit 180 moves the predetermined lenses in the zoom lens 111 based on the control signal from the processor 160.

When playing back the image data recorded in the memory card 190, the reader-writer 150 reads out a predetermined image data from the memory card 190 according to the manipulation accepted by the manipulation acceptance unit 170. Then, after decompression decoding by the image processing unit 130, the image signal to be played back is outputted to the display unit 140 and the played-back image is displayed.

Incidentally, in the above-mentioned embodiments, a digital still camera is supposed exemplarily as the image capturing apparatus 100, whereas the image capturing apparatus 100 is not limited to the digital still camera but can be widely applied to digital input/output equipment such as a digital video camera.

As above, according to the embodiments of the present technology, changing a relative position between two lens groups or a role to rule focusing between them enables to perform switching between the normal mode and macro mode without any change of the other lens positions.

It should be understood by those skilled in the art that various modifications, combinations, sub-combinations and alterations may occur depending on design requirements and other factors insofar as they are within the scope of the appended claims or the equivalents thereof.

Additionally, the present technology may also be configured as below.

(1) A zoom lens including:
first and second lens groups independently movable in an optical axis direction in an optical system,
wherein, before and after switching between two modes different in minimum focusing distance, a lens group to rule focusing changes between the first and second lens groups or a relative position between the first and second lens groups changes.

(2) The zoom lens according to (1),
wherein, in a mode shorter in minimum focusing distance of the two modes, a focusing distance range is changed to a short distance side by shifting any one of the first and second lens groups per zoom position by a certain amount.

(3) The zoom lens according to (1) or (2),
wherein at least one of the first and second lens groups independently moves in zooming.

(4) The zoom lens according to any one of (1) to (3),
wherein both of the first and second lens groups move in focusing, with movement amounts of the first and second lens groups associated with each other.

(5) The zoom lens according to any one of (1) to (4), wherein the first and second lens groups are arranged alongside on a closest side to an image in the optical system.

(6) The zoom lens according to any one of (1) to (5), wherein each of the first and second lens groups includes one lens.

(7) The zoom lens according to any one of (1) to (6), wherein at least one of the first and second lens groups includes one plastic lens.

(8) The zoom lens according to any one of (1) to (7), further including a lens having substantially no lens power.

(9) A zoom lens including: in order from an object side,
a first zoom lens group having positive refractive power;
a second zoom lens group having negative refractive power;
a third zoom lens group having positive refractive power; and
a fourth zoom lens group having positive refractive power,
wherein a negative lens disposed on a closest side to an image in the third lens group and a positive lens included in the fourth zoom lens group are independently movable in an optical axis, and
wherein, before and after switching between two modes different in minimum focusing distance, a lens to rule focusing changes between the negative lens and the positive lens or a relative position between the negative lens and the positive lens changes.

(10) The zoom lens according to any one of (9), further including a lens having substantially no lens power.

(11) A zoom lens including: in order from an object side,
a first zoom lens group having positive refractive power;
a second zoom lens group having negative refractive power;
a third zoom lens group having positive refractive power;
a fourth zoom lens group having negative refractive power; and
a fifth zoom lens group having positive refractive power,
wherein a negative lens included in the fourth zoom lens group and a positive lens included in the fifth zoom lens group are independently movable in an optical axis direction, and
wherein, before and after switching between two modes different in minimum focusing distance, a lens to rule focusing changes between the negative lens and the positive lens or a relative position between the negative lens and the positive lens changes.

(12) The zoom lens according to any one of (11), further including a lens having substantially no lens power.

(13) An image capturing apparatus including:
a zoom lens including first and second lens groups independently movable in an optical axis direction in an optical system; and
an image sensor converting an optical image formed by the zoom lens into an electric signal,
wherein, before and after switching between two modes different in minimum focusing distance, a lens group to rule focusing changes between the first and second lens groups or a relative position between the first and second lens groups changes.

(14) The image capturing apparatus according to (13), further including:
a selection part configured to select one of the two modes.

(15) The image capturing apparatus according to (14), further including a lens having substantially no lens power in the zoom lens.

What is claimed is:

1. A zoom lens comprising:
in order from an object side,
a first zoom lens group having positive refractive power;
a second zoom lens group having negative refractive power;
a third zoom lens group having positive refractive power; and
a fourth zoom lens group having positive refractive power,
wherein a negative lens disposed on a closest side to an image in the third zoom lens group and a positive lens included in the fourth zoom lens group are independently movable in an optical axis, and
wherein, before and after switching between two modes different in minimum focusing distance, a lens to rule focusing changes between the negative lens and the positive lens or a relative position between the negative lens and the positive lens changes.

2. The zoom lens according to claim 1, wherein, in a mode shorter in minimum focusing distance of the two modes, a focusing distance range is changed to a short distance side by shifting any one of the positive lens and the negative lens per zoom position by a certain amount.

3. The zoom lens according to claim 1, wherein at least one of the positive lens and the negative lens independently moves in zooming.

4. The zoom lens according to claim 1, wherein both of the positive lens and the negative lens move in focusing, with movement amounts of the positive lens and the negative lens associated with each other.

5. The zoom lens according to claim 1, wherein the positive lens and the negative lens are arranged alongside on a closest side to an image in the optical system.

6. The zoom lens according to claim 1, wherein each of the third zoom lens group and the fourth zoom lens group includes one lens.

7. The zoom lens according to claim 1, wherein at least one of the positive lens and the negative lens is a plastic lens.

8. A zoom lens comprising:
in order from an object side,
a first zoom lens group having positive refractive power;
a second zoom lens group having negative refractive power;
a third zoom lens group having positive refractive power;
a fourth zoom lens group having negative refractive power; and
a fifth zoom lens group having positive refractive power,
wherein a negative lens included in the fourth zoom lens group and a positive lens included in the fifth zoom lens group are independently movable in an optical axis direction, and
wherein, before and after switching between two modes different in minimum focusing distance, a lens to rule focusing changes between the negative lens and the positive lens or a relative position between the negative lens and the positive lens changes.

9. The zoom lens according to claim 8, wherein, in a mode shorter in minimum focusing distance of the two modes, a focusing distance range is changed to a short distance side by shifting any one of the positive lens and the negative lens per zoom position by a certain amount.

10. The zoom lens according to claim 8, wherein at least one of the positive lens and the negative lens independently moves in zooming.

11. The zoom lens according to claim 8, wherein both of the first and second lens groups move in focusing, with movement amounts of the positive lens and the negative lens associated with each other.

12. The zoom lens according to claim 8 wherein the positive lens and the negative lens are arranged alongside on a closest side to an image in the optical system.

13. The zoom lens according to claim 8, wherein each of the positive lens and the negative lens includes one lens.

14. The zoom lens according to claim 8, wherein at least one of the positive lens and the negative lens is a plastic lens.

15. An image capturing apparatus comprising:
a zoom lens comprising:
in order from an object side,
    a first zoom lens group having positive refractive power,
    a second zoom lens group having negative refractive power,
    a third zoom lens group having positive refractive power, and
    a fourth zoom lens group having positive refractive power; and
an image sensor converting an optical image formed by the zoom lens into an electric signal,
wherein a negative lens disposed on a closest side to an image in the third zoom lens group and a positive lens included in the fourth zoom lens group are independently movable in an optical axis, and
wherein, before and after switching between two modes different in minimum focusing distance, a lens to rule focusing changes between the negative lens and the positive lens or a relative position between the negative lens and the positive lens changes.

16. The image capturing apparatus according to claim 15, further comprising:
a selection part configured to select one of the two modes.

17. An image capturing apparatus:
a zoom lens comprising:
in order from an object side,
    a first zoom lens group having positive refractive power,
    a second zoom lens group having negative refractive power,
    a third zoom lens group having positive refractive power,
    a fourth zoom lens group having negative refractive power, and
    a fifth zoom lens group having positive refractive power; and
an image sensor converting an optical image formed by the zoom lens into an electric signal,
wherein a negative lens included in the fourth zoom lens group and a positive lens included in the fifth zoom lens group are independently movable in an optical axis direction, and
wherein, before and after switching between two modes different in minimum focusing distance, a lens to rule focusing changes between the negative lens and the positive lens or a relative position between the negative lens and the positive lens changes.

18. The image capturing apparatus according to claim 17, further comprising:
a selection part configured to select one of the two modes.

* * * * *